United States Patent
Masuda et al.

(10) Patent No.: US 8,359,061 B2
(45) Date of Patent: Jan. 22, 2013

(54) RADIO COMMUNICATION SYSTEM, RADIO TERMINAL, BASE STATION, AND BASE STATION SEARCH METHOD

(75) Inventors: Yoichi Masuda, Osaka (JP); Takashi Matsumoto, Osaka (JP); Hironori Nakae, Osaka (JP); Yosuke Ukita, Osaka (JP); Hiroshi Hayashino, Hyogo (JP)

(73) Assignee: Panasonic Corporation, Osaka (JP)

( * ) Notice: Subject to any disclaimer, the term of this patent is extended or adjusted under 35 U.S.C. 154(b) by 1093 days.

(21) Appl. No.: 12/302,141

(22) PCT Filed: Jun. 4, 2007

(86) PCT No.: PCT/JP2007/061303
§ 371 (c)(1),
(2), (4) Date: Nov. 24, 2008

(87) PCT Pub. No.: WO2007/142199
PCT Pub. Date: Dec. 13, 2007

(65) Prior Publication Data
US 2009/0190553 A1     Jul. 30, 2009

(30) Foreign Application Priority Data

Jun. 6, 2006  (JP) .................................. 2006-156949
Sep. 6, 2006  (JP) .................................. 2006-240990

(51) Int. Cl.
*H04W 4/00*   (2009.01)
*H04W 24/00*  (2009.01)
*H04W 36/00*  (2009.01)
*H04B 7/00*   (2006.01)
*H04B 1/38*   (2006.01)

(52) U.S. Cl. ...... 455/525; 455/436; 455/561; 455/456.4; 455/438; 455/437; 455/439; 370/331; 370/329

(58) Field of Classification Search .................. 455/525, 455/436, 561, 456.1, 437, 438, 439; 370/331, 370/329
See application file for complete search history.

(56) References Cited

U.S. PATENT DOCUMENTS 5,812,949 A * 9/1998 Taketsugu ..................... 455/439
(Continued)

FOREIGN PATENT DOCUMENTS

JP       2004-88592       3/2004
(Continued)

OTHER PUBLICATIONS

International Search Report issued Sep. 11, 2007 in the International (PCT) Application of which the present application is the U.S. National Stage.

*Primary Examiner* — Bobbak Safaipour
(74) *Attorney, Agent, or Firm* — Wenderoth Lind & Ponack, L.L.P.

(57) ABSTRACT

A wireless communication system includes a wireless terminal and a plurality of base stations that can communicate with each other via a predetermined communication path that is different from the wireless communication path to the wireless terminal. The wireless terminal transmits a request signal to one of the base stations to request a response signal from another base station. The one base station transfers the received request signal to the other base station via the predetermined communication path. Upon reception of the request signal transferred from the one base station, the second base station transmits a response signal to the wireless terminal via the predetermined channel. The wireless terminal receives the response signal transmitted from the second base station via the predetermined channel.

10 Claims, 24 Drawing Sheets

U.S. PATENT DOCUMENTS

| | | | |
|---|---|---|---|
| 7,359,358 B2 * | 4/2008 | Shipman | 370/337 |
| 7,546,125 B2 * | 6/2009 | Sharma et al. | 455/436 |
| 7,587,200 B2 * | 9/2009 | Mishina et al. | 455/422.1 |
| 7,656,835 B2 * | 2/2010 | Joutsenvirta et al. | 370/328 |
| 7,673,061 B2 * | 3/2010 | Nubani et al. | 709/230 |
| 7,742,766 B2 * | 6/2010 | Liu et al. | 455/436 |
| 7,751,816 B2 * | 7/2010 | Jung | 455/432.1 |
| 7,903,607 B2 * | 3/2011 | Utsunomiya et al. | 370/329 |
| 7,912,465 B2 * | 3/2011 | Abdel-Kader et al. | 455/434 |
| 7,940,735 B2 * | 5/2011 | Kozisek et al. | 370/338 |
| 7,949,352 B2 * | 5/2011 | Ryu et al. | 455/458 |
| 8,009,629 B2 * | 8/2011 | Aso | 370/331 |
| 8,036,672 B2 * | 10/2011 | Laroia et al. | 455/450 |
| 2004/0043767 A1 | 3/2004 | Tsutsumi et al. | |
| 2005/0083886 A1 | 4/2005 | Ikeda | |
| 2006/0030325 A1 * | 2/2006 | Okita et al. | 455/439 |
| 2007/0280138 A1 * | 12/2007 | Stern | 370/254 |
| 2009/0017837 A1 * | 1/2009 | Kim et al. | 455/456.1 |
| 2009/0111451 A1 * | 4/2009 | Okita et al. | 455/418 |

FOREIGN PATENT DOCUMENTS

| | | |
|---|---|---|
| JP | 2004-112171 | 4/2004 |
| JP | 3636696 | 4/2005 |
| JP | 2005-143088 | 6/2005 |
| JP | 2006-101540 | 4/2006 |
| JP | 2007-180753 | 7/2007 |

* cited by examiner

FIG. 4

| AP | SSID | USED FREQUENCY |
|---|---|---|
| AP01 | 1111AAAAA | CHa |
| AP02 | 2222BBBBB | CHb |
| AP03 | 3333CCCCC | CHc |
| AP04 | 4444DDDDD | CHd |
| AP05 | 5555EEEEE | CHe |
| AP06 | 6666FFFFF | CHf |

FIG. 10

| AP | SSID | USED FREQUENCY | CHANNEL BUSY RATE |
|---|---|---|---|
| AP01 | 1111AAAAA | CHa | 10% |
| AP02 | 2222BBBBB | CHb | 5% |
| AP03 | 3333CCCCC | CHc | 30% |
| AP04 | 4444DDDDD | CHd | 60% |
| AP05 | 5555EEEEE | CHe | 20% |
| AP06 | 6666FFFFF | CHf | 30% |

PROBE REQUEST FRAME

RADIO COMMUNICATION SYSTEM, RADIO TERMINAL, BASE STATION, AND BASE STATION SEARCH METHOD

TECHNICAL FIELD

The present invention relates to base station search technology used by a wireless communication system that performs wireless communication between wireless terminals via a base station, and in particular to base station search technology used when handover is performed between base stations that use different used channels.

BACKGROUND ART

In a wireless communication system such as a wireless LAN (Local Area Network), a wireless terminal establishes wireless communication with a single base station and communicates with other wireless terminals via the base station.

If transmission strength between the wireless terminal and the base station weakens during wireless communication due to movement or the like, the wireless terminal switches the wireless connection target to another base station that is located in the vicinity of the base station and has stronger transmission strength, thereby performing so-called "handover".

Hereinafter, the wireless terminal is referred to as a station, and the base station is referred to as an access point (or abbreviated AP). In particular, an access point with which the station has established a wireless connection (handover source) is called a serving access point, and an access point that is located in the vicinity of the serving access point and with which the wireless terminal has not established a wireless connection (handover target candidate) is called a neighboring access point.

A terminal such as a PDA (Personal Digital Assistant) or a PHS (Personal Handy-phone System) including a wireless LAN function may be used as the wireless terminal.

Generally speaking, when the transmission strength (for example, a Received Signal Strength Indication (RSSI)) between the station and the serving access point falls below a predetermined threshold, the station judges that handover is necessary. To search for an access point as a handover target, the station performs a search, called a scan, for connectable neighboring access points. During the scan, the station transmits an access point search signal called a probe request frame to neighboring access points whose used channels are different, and receives a response signal called a probe response frame that is sent from each neighboring access point as a response to the signal. The station performs handover upon selecting, from among the neighboring access points, the neighboring access point that has the highest RSSI when the probe response frame is received.

Here, for example, in the known IEEE 802.11b standard, 14 channels in a frequency band from 2.412 GHz to 2.483 GHz are used in Japan. For this reason, during the above-described scan, the station must search for neighboring access points either on all the channels or on selected ones of the 14 channels that are in a predetermined range.

Also, patent document 1 discloses a technology for reducing the number of neighboring access points to be scanned for handover by accumulating a history of a number of times that the station has performed handover to each of the neighboring access points, and targeting a predetermined number of neighboring access points for scanning whose history indicates a high number of times that handover has been performed.

Patent document 1: Japanese Patent Publication No. 3636696

SUMMARY OF THE INVENTION

In the above-described conventionally known neighboring access point search method, since a station must sequentially scan a plurality of neighboring access points corresponding to a plurality of channels, determining an access point as the handover target is time-consuming. As a result, the station cannot perform high-speed handover.

Also, although a past history is used in the above-described technology of patent document 1, effectiveness is lost when many neighboring access points are recorded in the history, such as when the station moves frequently in a short time.

Furthermore, even provided that the number of neighboring access points to be scanned by the station can be reduced by using a history, an access point that has been a handover target in the past does not necessarily satisfy the conditions for being a best handover target at the present time. Therefore, handover effectiveness is lost, since when there is an optimal neighboring access point other than the candidates to be scanned, there is a possibility of the station not being able to perform handover to the optimal neighboring access point that is expected to have a higher RSSI.

In view of the above, an object of the present invention is to provide a technology for performing a high-speed scan operation for determining an optimal access point from among a plurality of neighboring access points whose used frequencies are different.

In order to solve the above problem, the present invention is a wireless communication system that includes a wireless terminal and a plurality of base stations, in which the plurality of base stations can communicate with each other via a predetermined communication path that is different from a wireless communication channel to the wireless terminal, wherein the wireless terminal includes a request signal transmission unit operable to transmit, to one base station among the plurality of base stations, a request signal for requesting a response signal from one or more other base stations among the plurality of base stations, and a response signal reception unit operable to receive the response signal transmitted from the one or more other base stations on a predetermined channel, the one base station includes a request signal reception unit operable to receive the request signal from the wireless terminal, and a request signal transfer unit operable to transfer the request signal received by the request signal reception unit to the one or more other base stations via the predetermined communication path, and the one or more other base stations include a response signal transmission unit operable to transmit the response signal to the wireless terminal on the predetermined channel upon receiving the request signal transmitted from the one base station.

Also, in order to solve the above problem, the present invention is a base station in a wireless communication system that includes a wireless terminal and a plurality of base stations, in which the plurality of base stations can communicate with each other via a predetermined communication path that is different from a wireless communication channel to the wireless terminal, the base station including: a request signal reception unit operable to receive a request signal transmitted from the wireless terminal while the base station and the wireless terminal are connected by a wireless connection; a request signal transfer unit operable to transfer the request signal received by the request signal reception unit to an other base station from among the one or more other base stations via the predetermined communication path, the other base station not being connected to the wireless terminal by the wireless connection; and a response signal transmission unit operable to, while the base station is not connected to the wireless terminal by the wireless connection, transmit the response signal to the wireless terminal on the predetermined channel upon receiving a request signal transmitted from a base station, from among the plurality of base stations, that is connected to the wireless terminal by the wireless connection.

Also, to solve the above problem, the present invention is a wireless terminal in a wireless communication system that includes the wireless terminal and a plurality of base stations, in which the plurality of base stations can communicate with each other via a predetermined communication path that is different from a wireless communication channel to the wireless terminal, the wireless terminal including: a request signal transmission unit operable to transmit, to one base station among the plurality of base stations, a request signal for requesting a response signal from one or more other base stations among the plurality of base stations, the request signal including channel information indicating a predetermined channel; and a response signal reception unit operable to receive a response signal from the other base station on the predetermined channel.

Also, to solve the above problem, the present invention is a base station search method in which a wireless terminal searches a plurality of base stations in a wireless communication system that includes the wireless terminal and the plurality of base stations, the plurality of base stations being able to communicate with each other via a predetermined communication path that is different from a wireless communication channel to the wireless terminal, the base station search method including: a request signal transmission step in which the wireless terminal transmits, to one base station among the plurality of base stations, a request signal for requesting a response signal from one or more other base stations among the plurality of base stations; a request signal reception step in which the one base station receives the request signal from the wireless terminal; a request signal transfer step in which the one base station transfers the request signal received by the request signal reception unit to the one or more other base stations via the predetermined communication path; a response signal transmission step in which the one or more other base stations transmit the response signal to the wireless terminal on the predetermined channel upon receiving the request signal transmitted from the one base station; and a response signal reception step in which the wireless terminal receives the response signal transmitted from the one or more other base stations via the predetermined channel.

The one base station is, for example, a base station that has established wireless communication with the wireless terminal, and the one or more other base stations are, for example, base stations that are in the vicinity of the one base station and that have not established a wireless connection with the wireless terminal.

Also, the request signal is, for example, a probe request frame specified in the IEEE 802.11 standard, and the response signal is, for example, a probe response frame specified in the IEEE 802.11 standard.

Also, the channel is a component for distinguishing between a plurality of base stations when performing communication, and is specifically a frequency band, a spread code, etc.

According to this structure, even when a plurality of base stations in a wireless communication system use different used channels for performing wireless communication, merely by transmitting a request signal once to one base station, the wireless terminal can receive a response signal from the one or more other base stations.

For example, if scanning the other base stations for the purpose of handover, etc. becomes necessary while the wireless terminal has established wireless communication with the one base station, the wireless terminal can scan the other base stations without having to transmit request signals sequentially on all of the plurality of used channels (for example, 14 channels) expected to be used by the other base stations.

According to this structure, the wireless terminal can rapidly finish scanning the other base stations and determine an optimal access point from among the scanned other base stations.

Also, in the wireless communication system, the one base station may be a base station with which the wireless terminal has established a wireless connection, and the one or more other base stations may be base stations with which the wireless terminal has not established a wireless connection.

According to this structure, the wireless terminal can scan a plurality of base stations (neighboring access points) with which a wireless connection has not been established, merely by transmitting a request signal once to a base station (serving access point) with which a wireless connection has been established.

Also, in the wireless communication system, in a case that the one or more other base stations are a plurality of other base stations, the predetermined channel may be a same channel for each of the plurality of other base stations.

According to this structure, the wireless terminal can rapidly finish receiving response signals from the plurality of other base stations merely by waiting on one channel to receive the response signals.

Also, in the wireless communication system, the wireless terminal may further include a storage unit operable to store therein channel information indicating a channel used by the one or more other base stations for wireless communication, and a channel setting unit operable to reference the channel information and set, as the predetermined channel, one channel that is different from the channel used by the one or more other base stations, wherein the request signal transmission unit may transmit information indicating the predetermined channel set by the channel setting unit by including the information in the request signal.

According to this structure, the wireless terminal can receive a response signal from the one or more other base stations on a predetermined channel preferred by the wireless terminal.

Also, in the wireless communication system, the one base station may further include a storage unit operable to store therein channel information indicating a channel used by the one or more other base stations, and a channel setting unit operable to reference the channel information and set, as the predetermined channel, one channel that is different from the channel used by the one or more other base stations, wherein the request signal transfer unit may transfer information indicating the predetermined channel set by the channel setting unit by including the information in the request signal.

According to this structure, since the one base station arbitrarily specifies a predetermined channel, the predetermined channel need not be specified by the wireless terminal. This enables reducing the load on the wireless terminal.

Also, in the wireless communication system, the one base station may be connected, via the predetermined communication path, to the plurality of base stations that include the one or more other base stations, the wireless terminal may further include a storage unit operable to store therein identification information for identifying each of the plurality of base stations, and a selection unit operable to select the one or more other base stations from among the plurality of base stations with reference to the identification information, wherein the request signal transmission unit may transmit identification information pertaining to the one or more other base stations selected by the selection unit by including the information in the request signal, and the request signal transfer unit may transfer the request signal to the one or more other base stations identified by the identification information included in the request signal.

This structure enables the wireless terminal to select base stations (other base stations) to scan on its own initiative.

Also, in the wireless communication system, the one base station may be connected, via the predetermined communication path, to a plurality of base stations that include the one or more other base stations, the one base station may further include a storage unit operable to store identification information for identifying each of the plurality of base stations, and a selection unit operable to select the one or more other base stations from among the plurality of base stations with reference to the identification information, wherein the request signal transfer unit may transfer the request signal to the one or more other base stations selected by the selection unit.

This structure enables the one base station to select base stations (other base stations) to scan on its own initiative.

Also, in the wireless communication system, the one base station may further include a communication state information reception unit operable to periodically receive communication state information indicating respective communication states from each of the plurality of base stations via the predetermined communication path, and a communication state transmission unit operable to sequentially transmit, to the wireless terminal, the communication state information received by the communication state information reception unit, wherein the selection unit may select, as the one or more other base stations, a base station whose communication state information indicates a communication state that satisfies a predetermined condition, from among the plurality of base stations.

According to this structure, the wireless terminal can, on its own initiative, use a communication state to narrow down the base stations (the other base stations) to be scanned. Control can be performed so that only base stations suitable for the wireless terminal are scanned, for example by only scanning base stations whose communication state is greater than or equal to a predetermined threshold.

Also, in the wireless communication system, the one base station may further include: a communication state information reception unit operable to periodically receive communication state information indicating respective communication states from each of the plurality of base stations via the predetermined communication path, wherein the selection unit may select, as the one or more other base stations, a base station whose communication state information has indicated a communication state that satisfies a predetermined condition, from among the plurality of base stations.

According to this structure, the one base station can, on its own initiative, use a communication state to narrow down the base stations (the other base stations) to be scanned. Control can be performed so that only base stations suitable for the network managed by the one base station are scanned, for example by only scanning base stations whose communication state is greater than or equal to a predetermined threshold.

Also, in the wireless communication system, the request signal transmission unit may transmit the request signal along with a condition pertaining to a communication state of the one or more other base stations, the request signal transfer unit may transfer the request signal, along with the condition, to the one or more other base stations, and the response signal transmission unit may transmit the response signal only if the communication state of the one or more other base stations satisfy the predetermined condition.

According to this structure, for example when there are a plurality of other base stations, the wireless terminal can search among the other base stations for a base station whose communication state satisfies the condition.

Also, in the wireless communication system, the wireless terminal may further include a judgment unit operable to judge whether performing handover processing is necessary, a base station determination unit operable to, in a case that the one or more other base stations are a plurality of other base stations, determine one other base station from among the plurality of other base stations in accordance with the response signals received by the response signal reception unit, and a handover petition unit operable to petition that handover be performed to the other base station determined by the base station determination unit, wherein the request signal transmission unit may transmit the request signal if the judgment unit has judged that the handover processing is necessary, and each of the plurality of other base stations may further include a handover processing unit operable to perform handover processing for establishing a wireless connection with the wireless terminal upon receiving a handover petition from the wireless terminal.

According to this structure, the wireless terminal can perform handover to an optimal base station selected from among the other base stations in accordance with a result of the high-speed scan.

BRIEF DESCRIPTION OF THE DRAWINGS

FIG. 4 shows a data structure of AP information;

FIG. 7 is a flowchart showing operation of a serving access point 200a;

FIG. 10 shows a data structure of AP information in embodiment 2;

FIG. 14 is a flowchart showing operation of a serving access point 500a;

Figure 1:
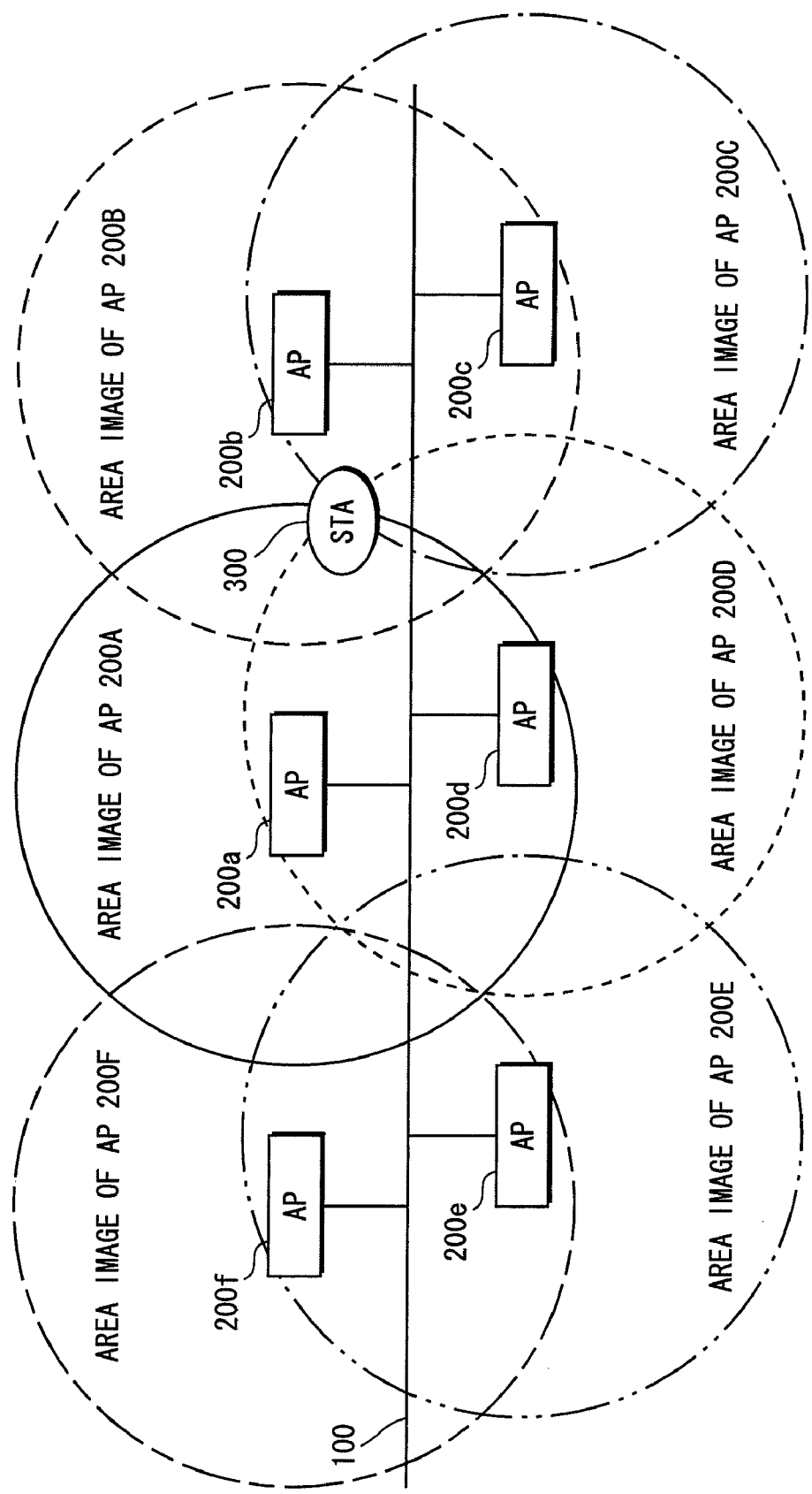
FIG. 1 shows a structure of a wireless LAN communication system of the present invention.

DESCRIPTION OF THE CHARACTERS 100 network line
200, 500, 700 access points
201 storage unit
202 control unit
203 program storage unit
203a AP information notification instruction unit
203b AP information update instruction unit
203c AP information transmission instruction unit
203d handover processing unit
203e request signal transfer instruction unit
203f probe response instruction unit
204 wireless LAN interface
205 bridge unit
206 LAN interface
300, 400, 600, 800 stations
301 wireless LAN interface
302 control unit
303 program storage unit
303a AP scan instruction unit
303b AP information update instruction unit
303c frequency specification unit
303d probe request instruction unit
303e AP determination unit
303f handover execution instruction unit
304 storage unit
401 AP selection unit
501 transfer target AP selection unit
601 condition setting unit
701 probe response ability judgment unit
801 priority information setting unit
901 priority information setting unit

DETAILED DESCRIPTION OF THE INVENTION

Embodiments of the present invention are described below with reference to the drawings.

Embodiment 1

The following describes a wireless communication system of embodiment 1.

1. Structure
1.1 Wireless LAN System Structure

FIG. 1 shows an overall structure of a wireless communication system pertaining to embodiment 1.

The following describes the wireless LAN system as an example of the wireless communication system.

In FIG. 1, the wireless LAN system includes a network line 100 that is a backbone, a plurality of access points 200a, 200b, 200c, 200d, 200e, and 200f that are connected to the network line 100, and a station 300.

Although for convenience, FIG. 1 shows six access points 200a to 200f, this is only a portion of the wireless LAN system, and the number of access points is not limited to this.

Similarly, although FIG. 1 shows one station 300, this is only a portion of the wireless LAN system, and the number of stations is not limited to this.

The network line 100 fulfills the function of a backbone for the access points 200a to 200f, and is a line for transmitting data between the access points. A specific example of the network line 100 is an Ethernet (registered trademark) that is compliant with the IEEE 802.3 standard.

The access points 200a to 200f fulfill the function of master stations of the station 300, and perform data mediation pertaining to transmission and reception between the station 300 and other stations. Specifically, for example, if one of the access points receives a frame from another access point via the network line 100, and the frame is addressed to a station under its management, the access point converts the frame into a frame compliant with the IEEE 802.3 standard, and transmits the frame to the station. Also, if a frame is sent from a station under its management and is addressed to a station managed by another access point, the access point transmits the frame to the network line 100.

Each of the access points 200a to 200f use a different one of frequency channels CHa to CHf, thus preventing radio wave interference between the access points.

Note that since the access points 200a to 200f all have a similar structure, hereinafter, the access points may be referred to collectively as the access points 200.

Also, hereinafter, in some cases, an access point is referred to simply as an AP.

Also, the circles that show areas of the access points 200 in the drawing indicate wireless zones of the respective access points 200.

The station 300 fulfills the function of a slave station of the access points 200, and performs transmission and reception of data with other stations 300 via the access points 200. Specifically, when transmitting data, the station 300 transmits frames indicating the address of the transmission target station to the access points 200, and when receiving data, the station 300 receives frames sent by the access points 200 that are addressed to the station 300.

Hereinafter, in the present description, the access point 200a is considered the serving access point of the station 300, and the access points 200b and 200f are considered the neighboring access points.

1.2 Access Point Structure

The following describes the structure of one of the access points 200.

Figure 2:
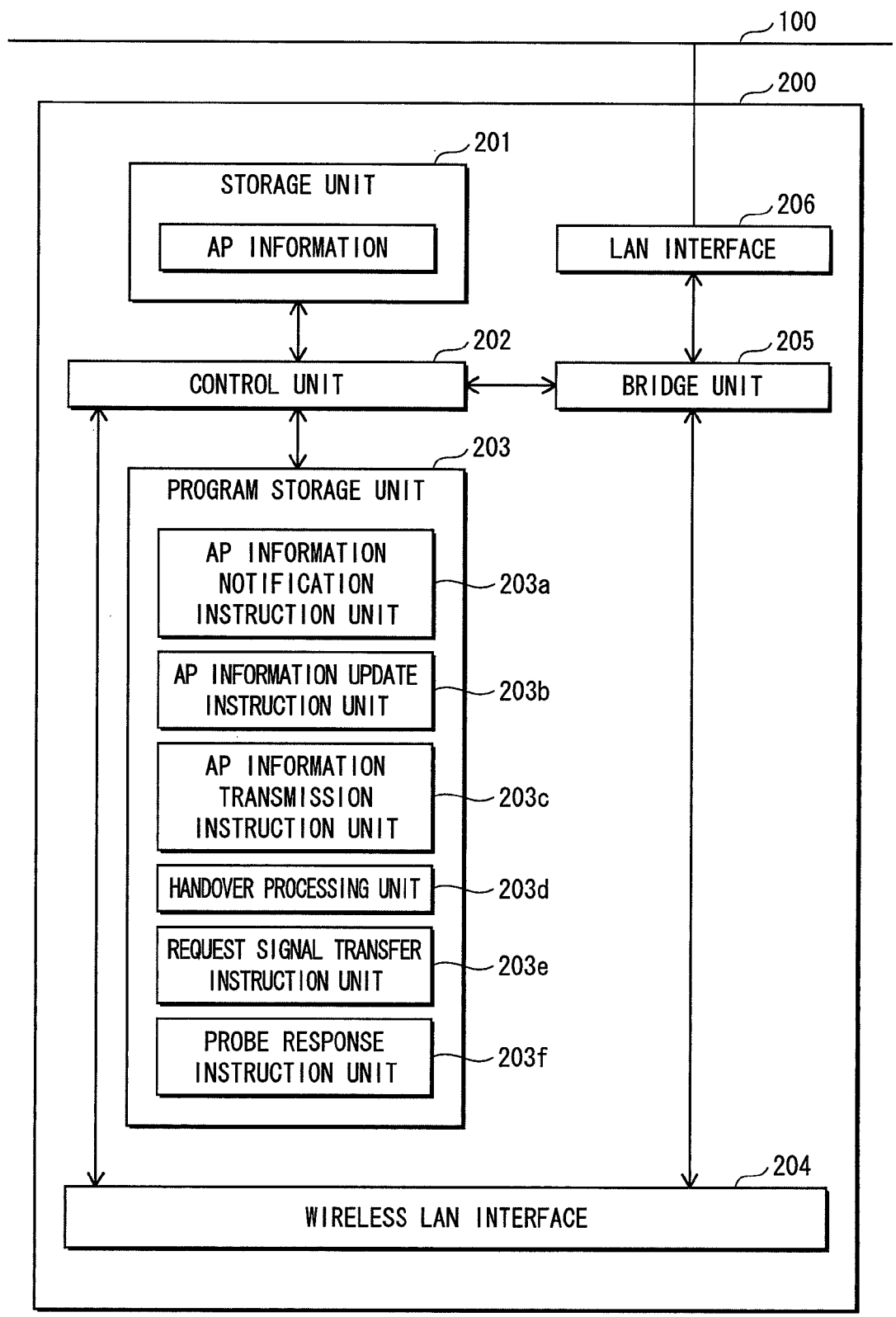
FIG. 2 is a block diagram showing a structure of a principal portion of an access point 200.

FIG. 2 is a block diagram showing the structure of a principal portion of the access point 200.

As shown in FIG. 2, the access point 200 includes a storage unit 201, a control unit 202, a program storage unit 203, a wireless LAN interface 204, a bridge unit 205, and a LAN interface 206.

The storage unit 201 stores various types of information for executing functions of the access point 200, and in particular stores and holds AP information (described later) indicating the used frequencies, etc. of each of the access points 200. Specifically, the storage unit 201 is realized by a RAM (Random Access Memory), for example.

The control unit 202 is a CPU (Central Processing Unit) that is connected to various units in the access point 200. The control unit 202 controls the various units by executing programs stored in the program storage unit 203.

The program storage unit 203 stores programs for the control unit 202 to execute, and in particular includes an AP information notification instruction unit 203a, an AP information update instruction unit 203b, an AP information transmission instruction unit 203c, a handover processing unit 203d, a request signal transfer instruction unit 203e, and a probe response instruction unit 203f as programs.

The AP information notification instruction unit 203a periodically issues an instruction to transmit information pertaining to the SSID (Service Set Identifier) and the used frequency of its access point 200 to the other access points 200, as AP information.

The AP information update instruction unit 203b issues an instruction to add the AP information that is periodically received from other access points 200 to the AP information in the storage unit 201, and sequentially update the information.

When transmitting a beacon or when there is a request from the station 300, the AP information transmission instruction unit 203c issues an instruction to transmit the AP information in the storage unit 201 to the station 300.

When performing handover with the station 300, the handover processing unit 203d transmits and receives control packets via the wireless LAN interface 204, and issues instructions for control of establishing and breaking a connection with the station 300.

Upon receiving a "probe request frame" that is a search frame (a frame that requests transmission of a signal from a base stations for the purpose of searching for base stations) from the station 300 via the wireless LAN interface 204, the request signal transfer instruction unit 203e issues an instruction to transfer the probe request frame to another access point 200 via the LAN interface 206 and the network line 100.

Upon receiving the probe request frame from another access point 200 via the LAN interface 206, the probe response instruction unit 203f issues an instruction to transmit a probe response frame corresponding to the probe request frame to the station 300 using the frequency indicated by the frequency information added to the probe request frame.

The wireless LAN interface 204 is for performing wireless LAN communication with the station 300, and generates, transmits and receives frames compliant with the IEEE 802.11 standard, for example.

According to the target address of the frame received from the station 300, the bridge unit 205 transmits the frame, either to another access point 200 via the LAN interface 206 and the network line 100, or to another station under the management of the same access point via the wireless LAN interface 204.

The LAN interface 206 is for performing LAN communication with other access points 200 via the network line 100, and transmits and receives frames compliant with the Ethernet (registered trademark) standard, for example.

1.3 Station Structure

The following describes the structure of the station 300.

Figure 3:
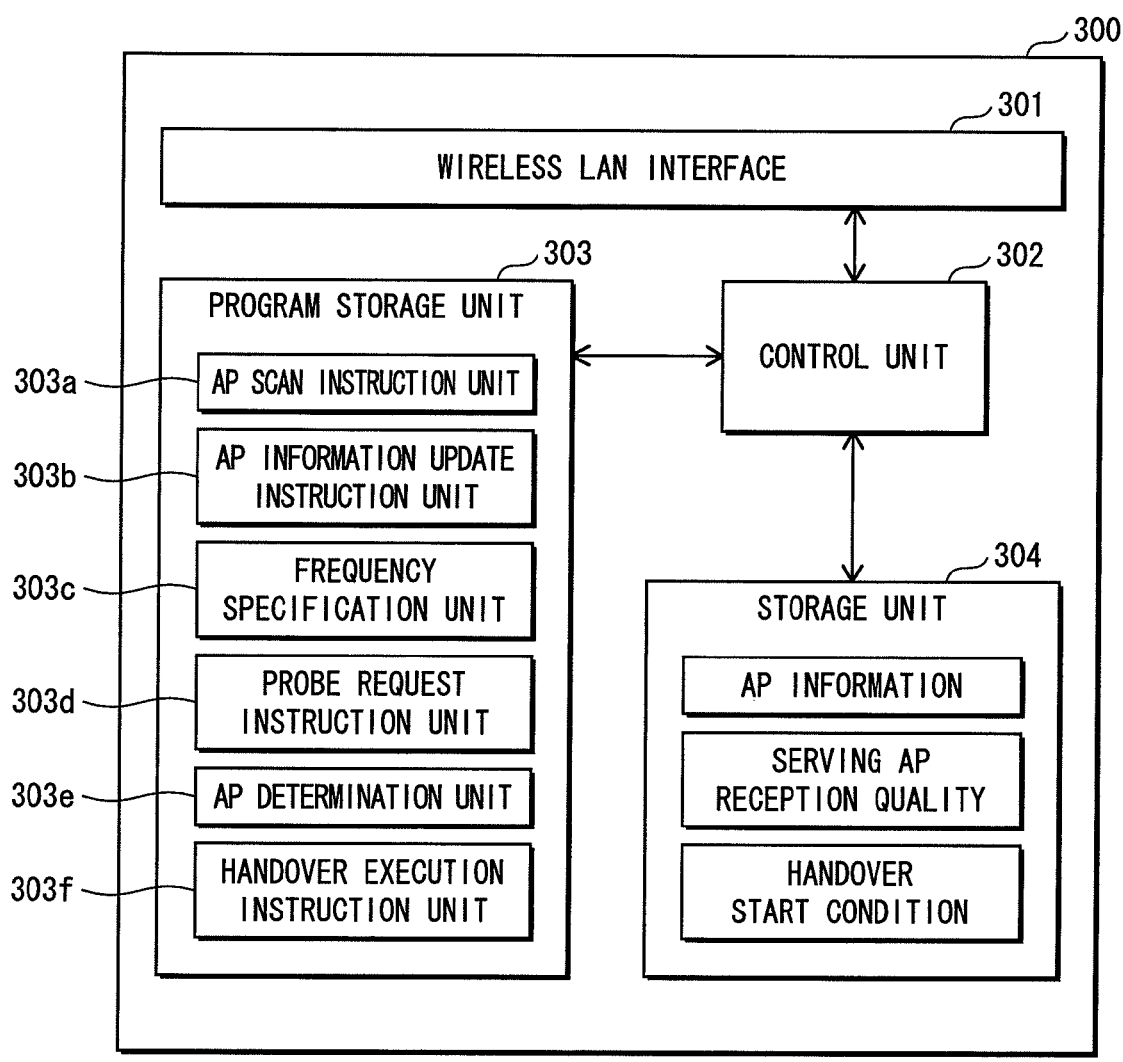
FIG. 3 is a block diagram showing a structure of a principal portion of a station 300.

FIG. 3 is a block diagram showing the structure of the principal portion of the station 300.

As shown in FIG. 3, the station 300 includes a wireless LAN interface 301, a control unit 302, a program storage unit 303, and a storage unit 304.

The wireless LAN interface 301 is for performing wireless LAN communication with the access points 200, and transmits and receives frames according to, for example, the IEEE 802.11 standard.

The control unit 302 is a CPU (Central Processing Unit) connected to various portions in the station 300, and performs control of the various portions by executing programs stored in the program storage unit 303.

The program storage unit 303 stores programs executed by the control unit 302, and in particular includes an AP scan instruction unit 303a, an AP information update instruction unit 303b, a frequency specification unit 303c, a probe request instruction unit 303d, an AP determination unit 303e, and a handover execution instruction unit 303f as programs.

The AP scan instruction unit 303a issues an instruction to periodically receive AP information from the serving access point 200 by active scan or passive scan.

The AP information update instruction unit 303b issues an instruction to sequentially store, in the storage unit 304, the AP information periodically received from the access points 200 via the wireless LAN interface 301.

With reference to the AP information in the storage unit 304, the frequency specification unit 303c specifies a frequency not used by the access points 200.

When handover becomes necessary, the probe request instruction unit 303d transmits a probe request frame including SSIDs, indicated by the AP information in the storage unit 304, of the neighboring access points 200 (the access points 200b to 200f) and the frequency information indicating the frequency specified by the frequency specification unit 303c to the serving access point 200 (the access point 200a).

The AP determination unit 303e determines which neighboring access point 200 has the strongest reception strength according to the respective reception strengths of the probe response frames received from the neighboring access points 200 via the wireless LAN interface 301.

To perform handover to the access point 200 determined by the AP determination unit 303e, the handover execution instruction unit 303f issues a control instruction to establish a connection with the determined access point 200.

The storage unit 304 stores various types of information for executing the functions of the station 300, and in particular stores and holds AP information, serving AP reception quality, and a handover start condition. Specifically, the storage unit 304 is a RAM (Random Access Memory), for example.

The serving AP reception quality is information indicating the reception strength of the frames received from the serving access point 200 via the wireless LAN interface 301, and this information is periodically updated.

The handover start condition is information indicating a condition upon which the control unit 302 is to start handover processing, and specifically is a lower threshold for reception quality of the serving access point 200, for example.

2. Data

The following describes the structure of various data.

2.1 AP Information

FIG. 4 shows a data structure of the AP information.

As shown in FIG. 4, the AP information includes an AP number, an SSID, and a used frequency.

The AP number is identification information used for managing information in the access points 200 and the station 300, and an AP number is assigned uniquely to each of the access points 200.

The SSID is identification information for identifying the access points 200 in the wireless LAN network, and an SSID is assigned uniquely to each of the access points 200. The SSID is specifically a MAC (Media Access Control) address, for example.

The used frequency is a frequency channel set to be used when performing wireless LAN communication with the stations under the management of the access points 200.

The AP information is generated when the AP information notification instruction units 203a and the AP information update instruction units 203b of the access points 200 exchange information pertaining to their respective SSIDs and used frequencies. The AP information is stored in the respective storage units 201 of the access points 200.

2.2 Probe Request Frame

Figure 5:
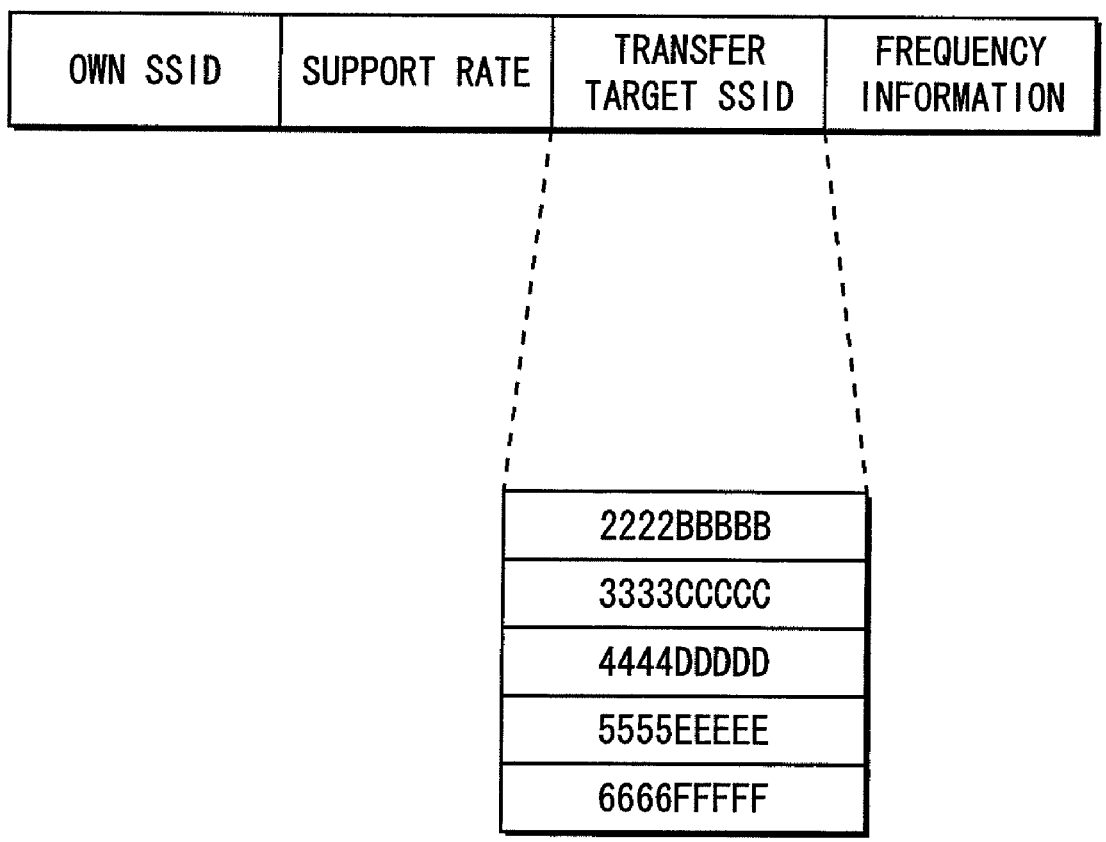
FIG. 5 shows a data structure of a probe request frame.

FIG. 5 shows the data structure of the probe request frame.

As shown in FIG. 5, the probe request frame includes transfer target SSIDs and frequency information, in addition to the information in a probe request frame specified in IEEE 802.11 standard (own SSID and support rate).

The transfer target SSIDs are the respective SSIDs of the neighboring access points 200b to 200f that are transfer targets.

The frequency information is information indicating frequencies used in communicating with stations under the management of the neighboring access points 200b to 200f that are transfer targets.

The probe request frame is generated and transmitted, with use of the SSIDs of the neighboring access points 200 and the frequency information indicating a frequency specified by the frequency specification unit 303c, in accordance with an instruction from the probe request instruction unit 303d of the station 300.

3. Operation

The following describes the operation of the access points 200 and the station 300.

Here, scanning the other access points 200 (the neighboring access points 200b to 200f) and performing handover when the station 300 has established a wireless connection with the access point 200a (the serving access point 200a) is described as an example.

3.1 Station Operation

The following describes the operation of the station 300.

Figure 6:
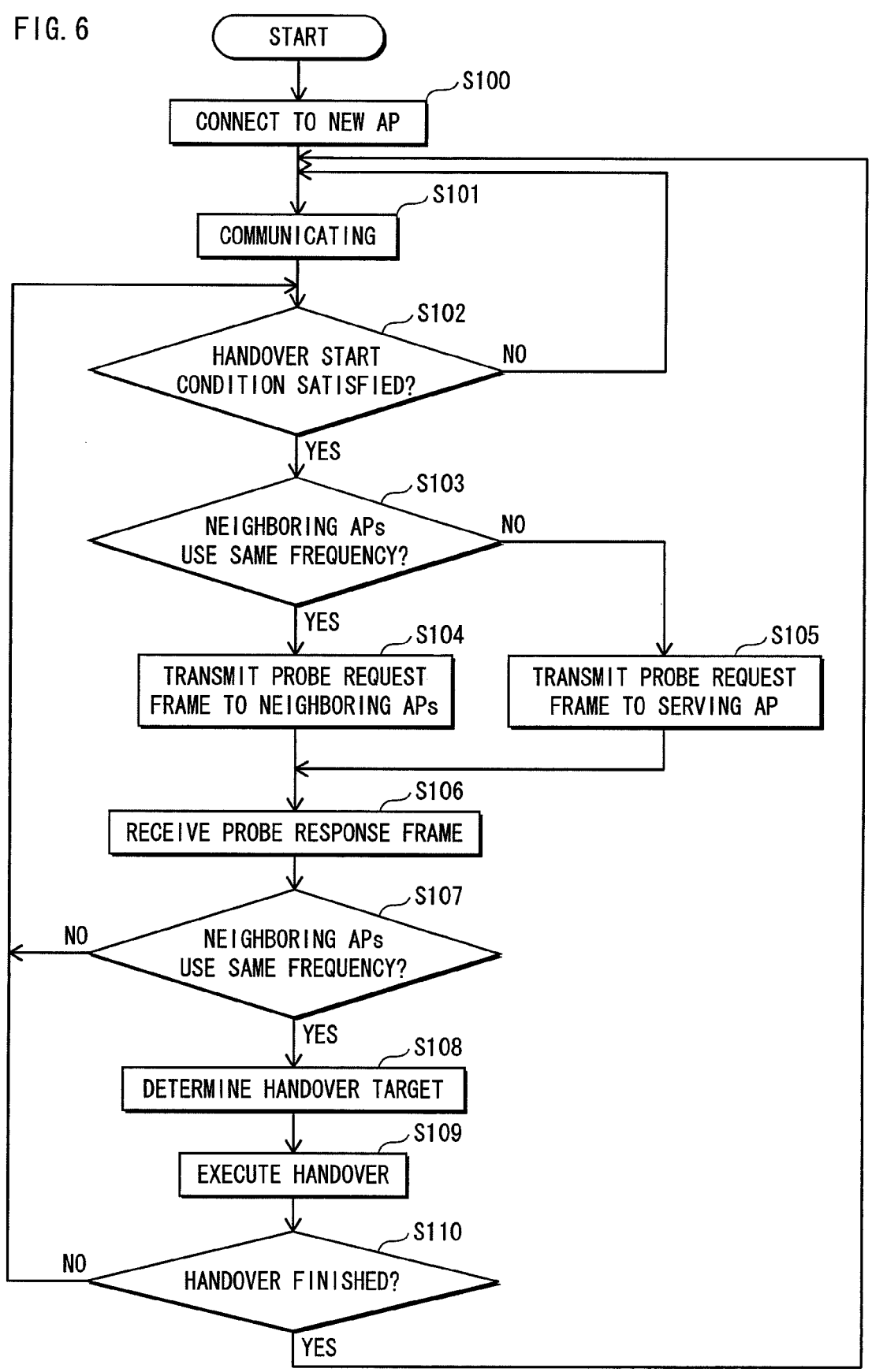
FIG. 6 is a flowchart showing operation of a station 300.

FIG. 6 is a flowchart showing the operation of the station 300.

After power is switched on, the station 300 searches for an optimal access point 200 by performing an active scan or a passive scan, and establishes a wireless connection (step S100). In the example described here, after the power is switched on, the optimal access point is the access point 200a.

While the station 300 has established wireless communication with the access point 200a (step S101), the communication continues provided that the reception strength while receiving frames from the access point 200a does not fall below the predetermined threshold and the handover start condition in the storage unit 304 is not satisfied (step S102: NO).

On the other hand, if the reception strength while receiving frames from the access point 200a falls below the predetermined threshold and the handover start condition is satisfied (step S102:YES), the station 300 judges, with reference to the AP information in the storage unit 304, whether the neighboring access points 200b to 200f use the same frequency as the serving access point 200a (step S103).

If the neighboring access points 200b to 200f use the same frequency as the serving access point 200a (step S103:YES), the station 300 transmits probe request frames via broadcast to all of the neighboring access points 200b to 200f at once. The probe request frames include frequency information indicating a frequency that is not being used by the access points 200 in the 14 channels (step S104). In the present embodiment, the frequency indicated by the frequency information is CHg. At this time, the respective SSIDs of the neighboring access points 200b to 200f may be set as addresses in the probe request frames, or a broadcast SSID may be set as the address.

On the other hand, if the neighboring access points 200b to 200f do not use the same frequency as the serving access point 200a (step S103:NO), the station 300 transmits to the serving access point 200a, with reference to the AP information in the storage unit 304, a probe request frame including the respective SSIDs of the neighboring access points 200b to 200f and frequency information indicating the frequency CHg that is not used by the access points 200 in the 14 channels (step S105).

After transmitting the probe request frame in step S104 or S105, the station 300 switches to the frequency CHg specified at the time of transmitting the probe request frame, and waits to receive a probe response frame in response to the probe request frame.

Here, for example, the period of time that the station 300 waits may be obtained by adding several milliseconds to the maximum length of a channel use period (TXOP: Transmission Opportunity) specified for each of the neighboring access points 200b to 200f. Since the neighboring access points 200b to 200f cannot transmit the probe response frames within the TXOP period, several milliseconds are added for waiting for the transmission of the probe response frames after the TXOP period has ended.

Upon receiving the probe response frames from each of the neighboring access points 200b to 200f (step S106), the station 300 judges whether there is an access point among the neighboring access points 200b to 200f that has a reception strength exceeding a predetermined threshold and that is suitable as a handover target (step S107).

If there is not an access point that is suitable as a handover target (step S107:NO), the station 300 continues communication with the serving access point 200a.

If there is one or more access points suitable as a handover target (step S107:YES), an access point having the highest reception strength among the suitable access points is determined as the handover target (step S108), and handover is executed (step S109). Here, specifically, the station 300 need only cause the used frequency to be the same as the used frequency of the handover target access point, and perform reassociation (reconnection) with the handover target access point.

Upon successfully establishing reassociation and finishing the handover (step S110:YES), the station 300 performs communication with the handover target access point.

If the station 300 cannot establish reassociation (step S110: NO), processing returns to step S102 and resumes from scanning the neighboring access points 200b to 200f again.

3.2 Access Point 200 Operation 3.2.1 Serving Access Point Operation

The following describes the operation of the serving access point 200a.

Figure 7:
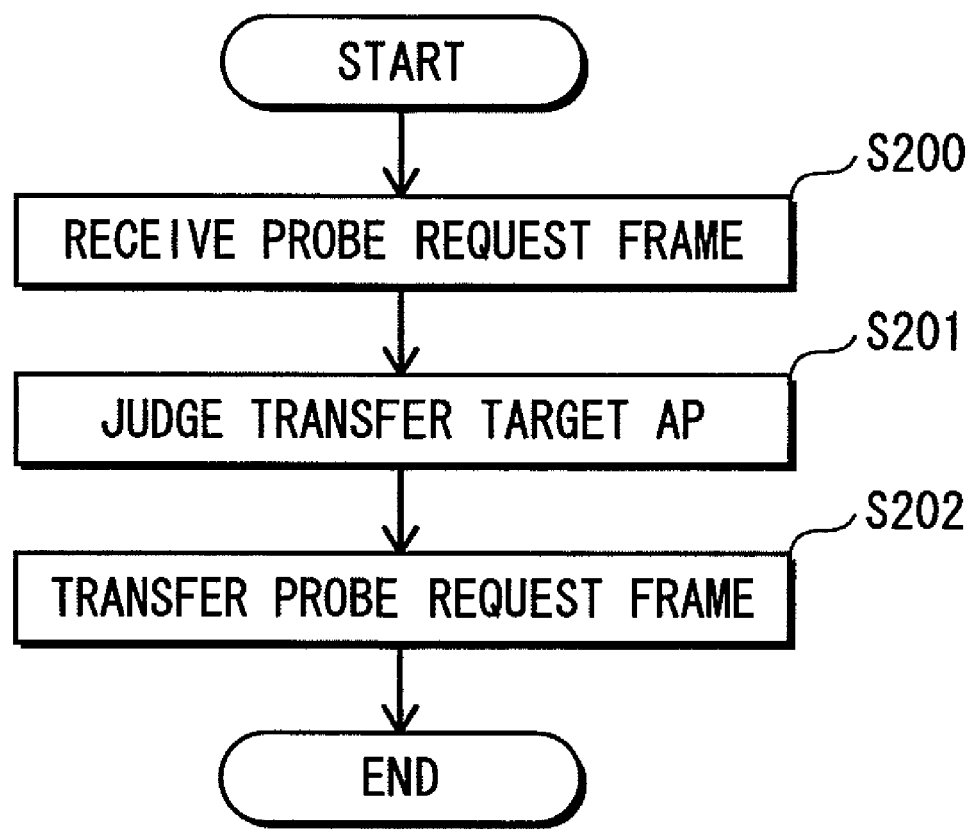

FIG. 7 shows the operation of the serving access point 200a.

As shown in FIG. 7, when the serving access point 200a receives a probe request sent in step S105 during communication with the station 300 when a wireless connection has been established (step S200), the serving access point 200a judges a transfer target for the probe request frame, with reference to the SSID included in the probe request frame (step S201).

The serving access point 200a transfers the probe request frame to the transfer targets that are the neighboring access points 200b to 200f (step S202).

3.2.2 Neighboring Access Point Operation

The following describes the operation of the neighboring access points 200b to 200f.

Figure 8:
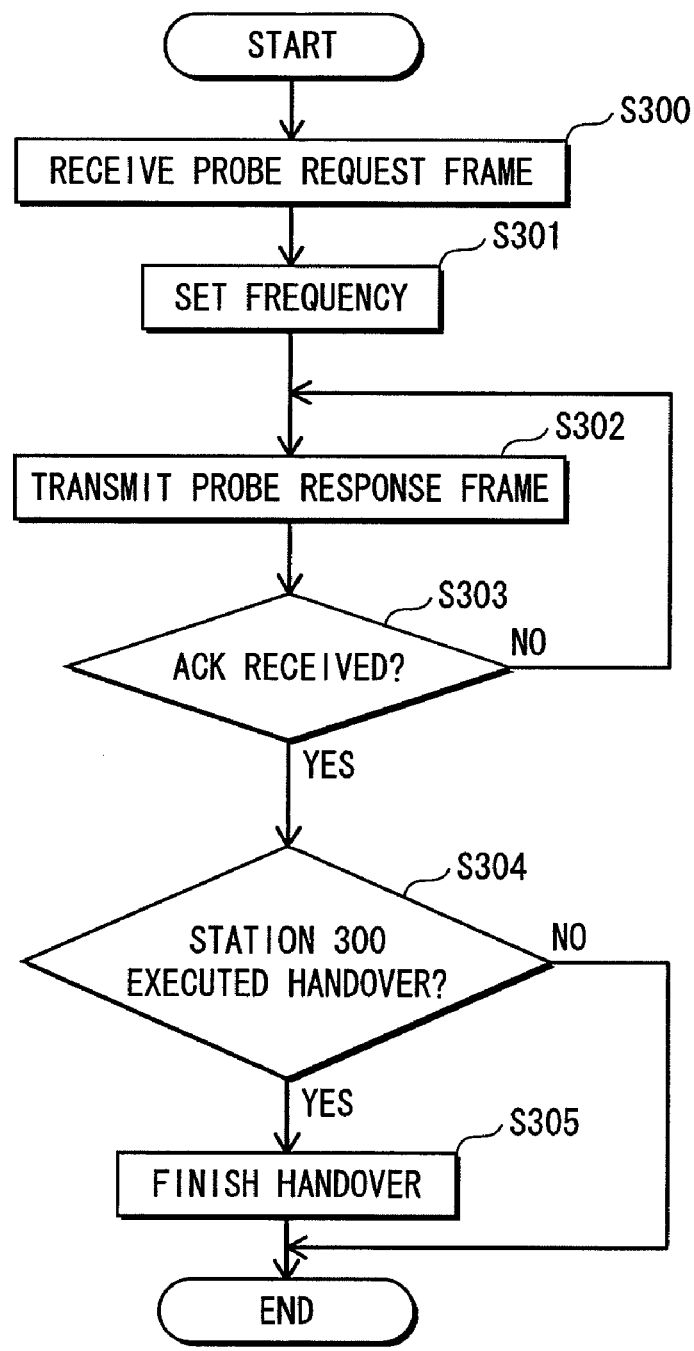
FIG. 8 is a flowchart showing operation of neighboring access points 200b to 200f.

FIG. 8 is a flowchart showing the operation of the neighboring access points 200b to 200f.

As shown in FIG. 8, upon receiving the probe request frame transferred by the serving access point 200a in step S202 (step S300), the neighboring access points 200b to 200f set, in the wireless LAN interface 204, the frequency CHg that is indicated by the frequency information included in the probe request frame, in order to transmit a probe response frame corresponding to the probe request frame (step S301).

The neighboring access points 200b to 200f transmit a probe response frame to the station 300 using the set frequency CHg when communication in the service area of the own neighboring access point enters an idle state (step S302).

Here, to prevent the probe response frames of the respective access points from colliding with each other during transmission, instead of performing each transmission immediately, the neighboring access points 200b to 200f may cause each of the respective transmissions to be delayed for a random period of time with use of a backoff algorithm specified in the IEEE 802.11 standard, etc.

Also, when the neighboring access points 200b to 200f receive the probe request frames, in a case that stations serving under the same access point have been given a specified channel use period (TXOP: Transmission Opportunity) by polling, after the TXOP ends, the neighboring access points 200b to 200f switch to the frequency CHg indicated by the frequency information to transmit the probe response frames.

Also, while the neighboring access points 200b to 200f are switching the frequency to transmit the probe response frames, since no ACK (acknowledgment) frame is received back even when the stations serving under the same access point transmit data, the neighboring access points 200b to 200f may switch the frequency to transmit the probe response frames after ensuring the availability of its TXOP by polling.

Upon receiving the ACK frame from the station 300 (step S303:YES), the neighboring access points 200b to 200f reset the original used frequency in the wireless LAN interface 204, and resume communication with the station that the particular neighboring access point serves under.

If the neighboring access points 200b to 200f cannot receive the ACK frame from the station 300 due to being unable to transmit the probe response frame, etc. (step S303: NO), processing returns to step S302, and the probe response frame is transmitted again. Here, to suppress the influence of the neighboring access points 200b to 200f on the communication between the respective stations serving under the neighboring access points 200b to 200f, it is preferable to set a number of times as an upper limit that the probe response frame can be retransmitted. In this case, the neighboring access points 200b to 200f stop transmitting the probe response frame when the number of times for transmitting the probe response frame reaches the upper limit.

Thereafter, if the station 300 has executed handover in step S109 (step S304:YES), that is to say if the procedure of reassociation from the station 300 has been performed, the neighboring access points 200b to 200f establish the reassociation and complete the handover processing with the station 300 (step S305).

As described above, when scanning the neighboring access points 200b to 200f, the station 300 transmits the probe request frame including the specified frequency information to the serving access point 200a only. The serving access point 200a transfers the probe request frame to the neighboring access points 200b to 200f. The neighboring access points 200b to 200f transmit probe response frames corresponding to the probe request frames transmitted from the serving access point 200a to the station 300 with use of the specified frequency.

This enables the station 300 to scan the neighboring access points 200b to 200f merely by transmitting a probe request frame once to the serving access point 200a. It is not necessary to scan by sequentially setting different frequencies corresponding to the access points 200b to 200f in the wireless LAN interface 301 and transmit probe request frames using each of the set frequencies.

This enables the station 300 to reduce the amount of time between starting and completing the scan of the neighboring access points 200b to 200f.

Also, this enables high-speed handover to be performed between the station 300 and the neighboring access points 200b to 200f.

Embodiment 2

The following describes a wireless communication system of embodiment 2.

In embodiment 1, since the station specifies all of the neighboring access points when transmitting the probe request frame to the serving access point (step S105), the serving access point transfers the probe request frame to all of the neighboring access points (step S202).

In contrast, embodiment 2 is different in that the station only specifies those of the neighboring access points that satisfy a predetermined condition when transmitting the probe request frame.

The following description focuses on the differences from embodiment 1.

1. Structure 1.1 Access Point Structure

Since the access points pertaining to embodiment 2 have substantially the same structure as the access points 200 of embodiment 1, the same reference notations are used, and the access points in the present embodiment are also described as the access points 200.

In embodiment 2, the AP information notification instruction unit 203a of each access point 200 periodically issues an instruction to transmit its channel busy rate to the other access points 200, in addition to information pertaining to its SSID and used frequency, as AP information.

The channel busy rate indicates, for each access point, a ratio of a current number of connected stations to an upper limit number of connected stations.

1.2 Station Structure

Since the station pertaining to embodiment 2 has a structure that has been changed from the structure of the station 300 of embodiment 1, a different reference notation is used, and the station is referred to as a station 400.

Note that in the structure of the station 400, components having the same structure as in the station 300 have been given the same reference notations, and description thereof is omitted here.

Figure 9:
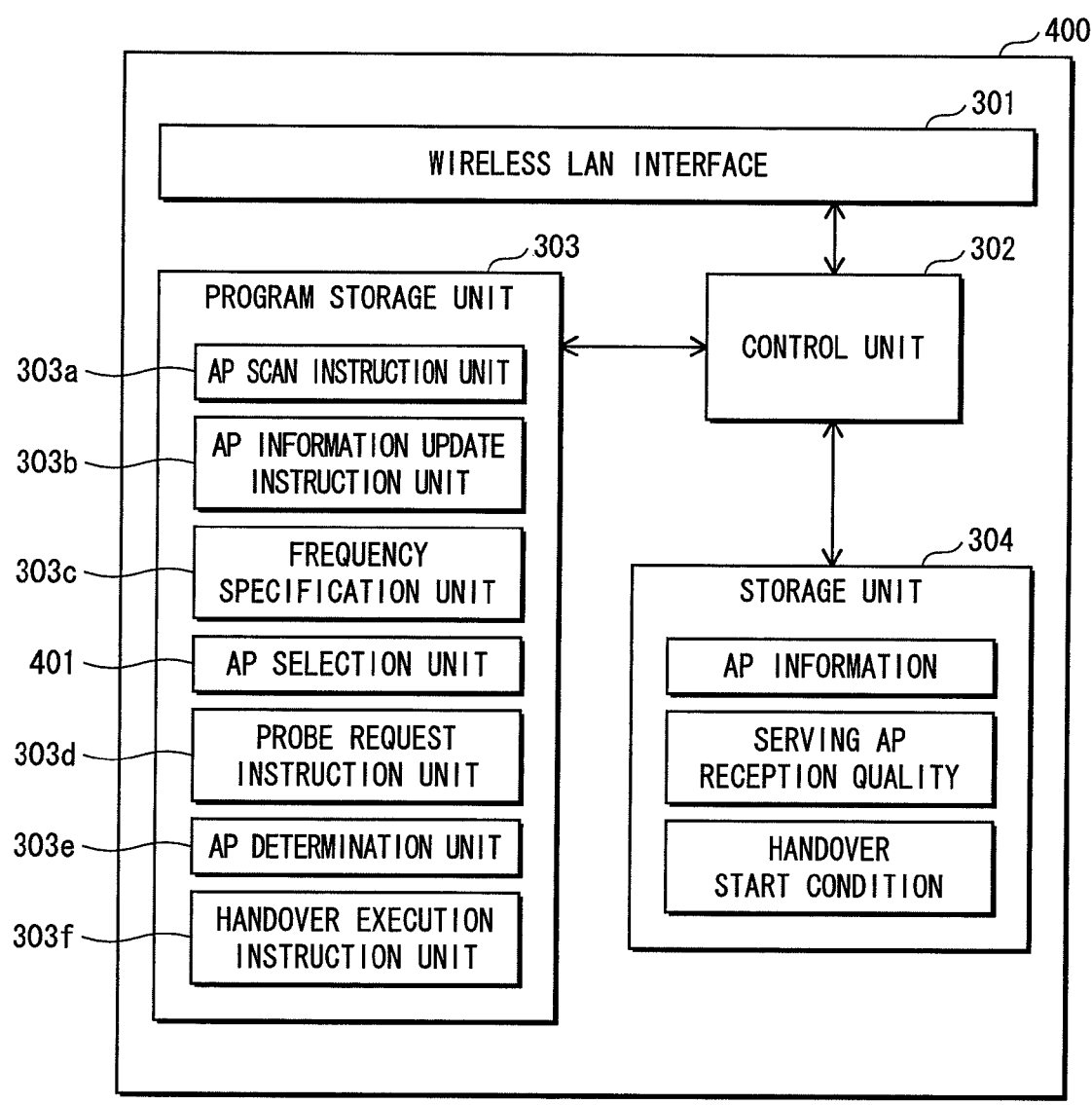
FIG. 9 is a block diagram showing a structure of a station 400.

FIG. 9 is a block diagram showing the structure of the station 400.

The station 400 includes a new AP selection unit 401 as a program in the program storage unit 303.

With reference to the channel busy rate included in the AP information in the storage unit 304, the AP selection unit 401 selects SSIDs of one or more neighboring access points, from among the neighboring access points 200b to 200f, whose channel busy rate is below a predetermined rate.

In embodiment 2, the probe request instruction unit 303d issues an instruction to transmit a probe request frame including the SSIDs of the one or more neighboring access points selected by the AP selection unit 401 and the frequency information indicating the frequency specified by the frequency specification unit 303c.

2. Data

FIG. 10 shows a data structure of the AP information in embodiment 2.

As shown in FIG. 10, in embodiment 2, the AP information includes AP numbers, SSIDs of each of the access points 200, the used frequencies of each of the access points 200, and also the channel busy rates of each of the access points 200.

3. Operation

Since the operation of the station 400 is unique in embodiment 2 compared to embodiment 1, the following description focuses on the operation of the station 400.

In addition to the operation performed by the station 300 of embodiment 1 (steps S100 to S110), the station 400 performs a new step S111.

The operation of the steps S100 to S110 is not described here.

Figure 11:
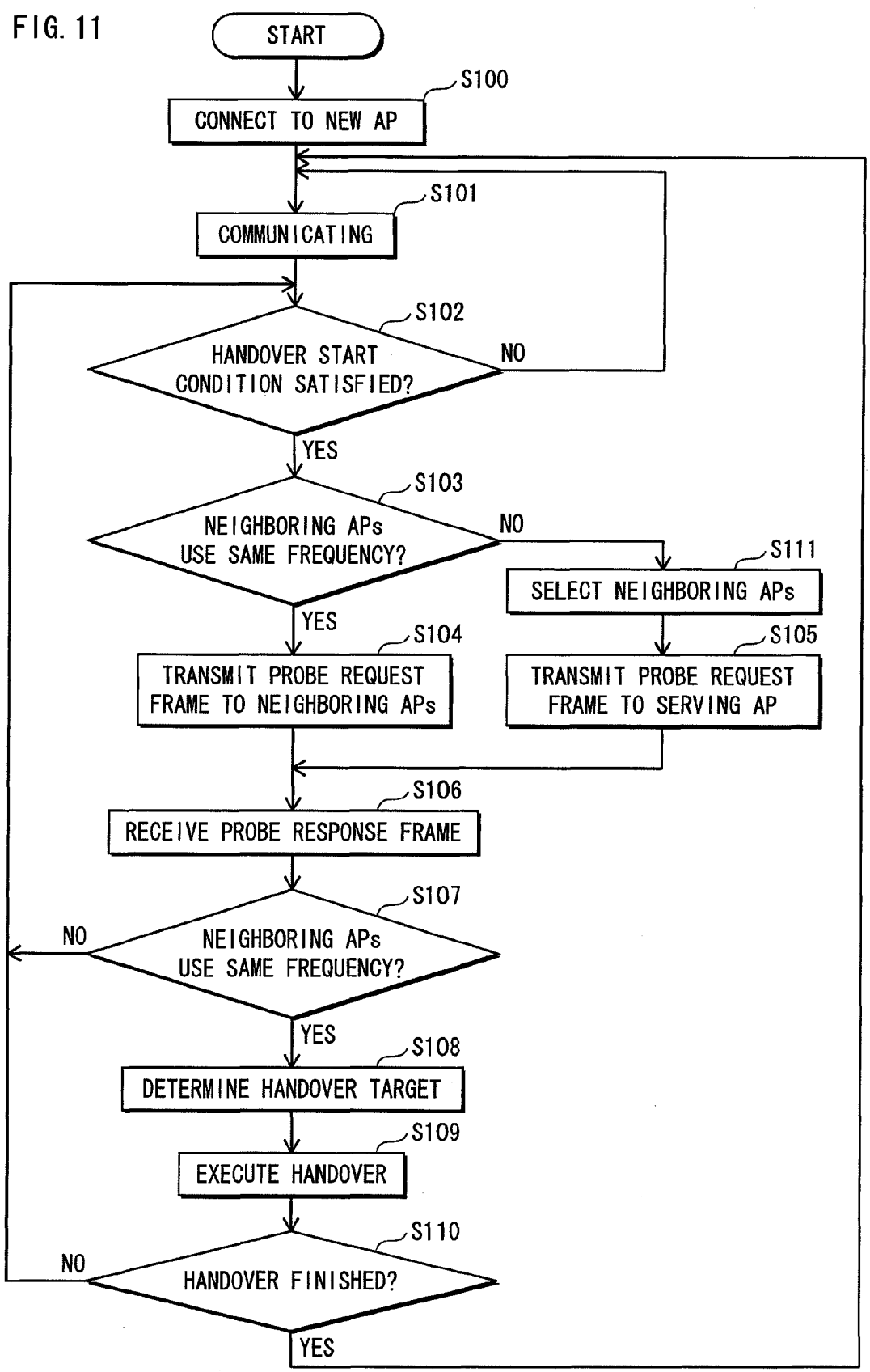
FIG. 11 is a flowchart showing operation of the station 400.

FIG. 11 is a flowchart showing the operation of the station 400.

After the handover start condition has been satisfied (step S102:YES), if the neighboring access points 200b to 200f do not use the same frequency as the serving access point 200a (step S103:NO), the station 400 selects one or more access points from among the neighboring access points 200b to 200f whose channel busy rate is below the predetermined rate, with reference to the AP information (step S111).

In step S105, the station 400 transmits to the serving access point 200a, a probe request frame including the SSID of the one or more access points selected in step S111 and frequency information indicating the frequency CHg that is not used by the access points 200.

Note that in embodiment 2, the operation of the serving access point 200a is similar to the operation in embodiment 1 (steps S200 to S202).

Note that in embodiment 2, the operation of the neighboring access points 200b to 200f is similar to the operation of embodiment 1 (steps S300 to S305).

As described above, in embodiment 2, the access points 200 notify each other of their respective channel busy rates, the station 400 specifies, with reference to the AP information, one or more neighboring access points whose channel busy rates are below the predetermined threshold, and the probe request frame is transmitted to the specified neighboring access point.

Therefore, the serving access point 200a transfers the probe request frame only to one or more neighboring access points that have been specified by the station 400 as having a low channel busy rate.

The station 400 can select a handover target candidate upon receiving probe response frames only from ones of the neighboring access points 200 that can ensure the availability of the bandwidth required by the station 400.

This is particularly useful in a case that the station 400 is performing communication that requires a large bandwidth, such as transmission and reception of videos, for enabling preventing a negative influence on communication resulting from a handover to one of the access points 200 that probably does not have a large bandwidth available.

Embodiment 3

The following describes a wireless communication system of embodiment 3.

In embodiment 1, the station transmits a probe request frame including SSIDs of neighboring access points that are to transfer the probe request frame, and the serving access point judges a transfer target with reference to the SSIDs included in the probe request frame.

In contrast, embodiment 3 is different in that the serving access point determines a transfer target on its own initiative, without the station specifying access points as transfer targets.

The following description focuses on differences from embodiment 1.

1. Structure 1.1 Access Point Structure

Since the access points pertaining to embodiment 3 have a structure that has been changed from the structure of the access points of embodiment 1, a different reference notation is used, and the access points are referred to as access points 500.

Note that in the structure of the access points 500, components having the same structure as in the access points 200 have been given the same reference notations, and description thereof is omitted here.

Figure 12:
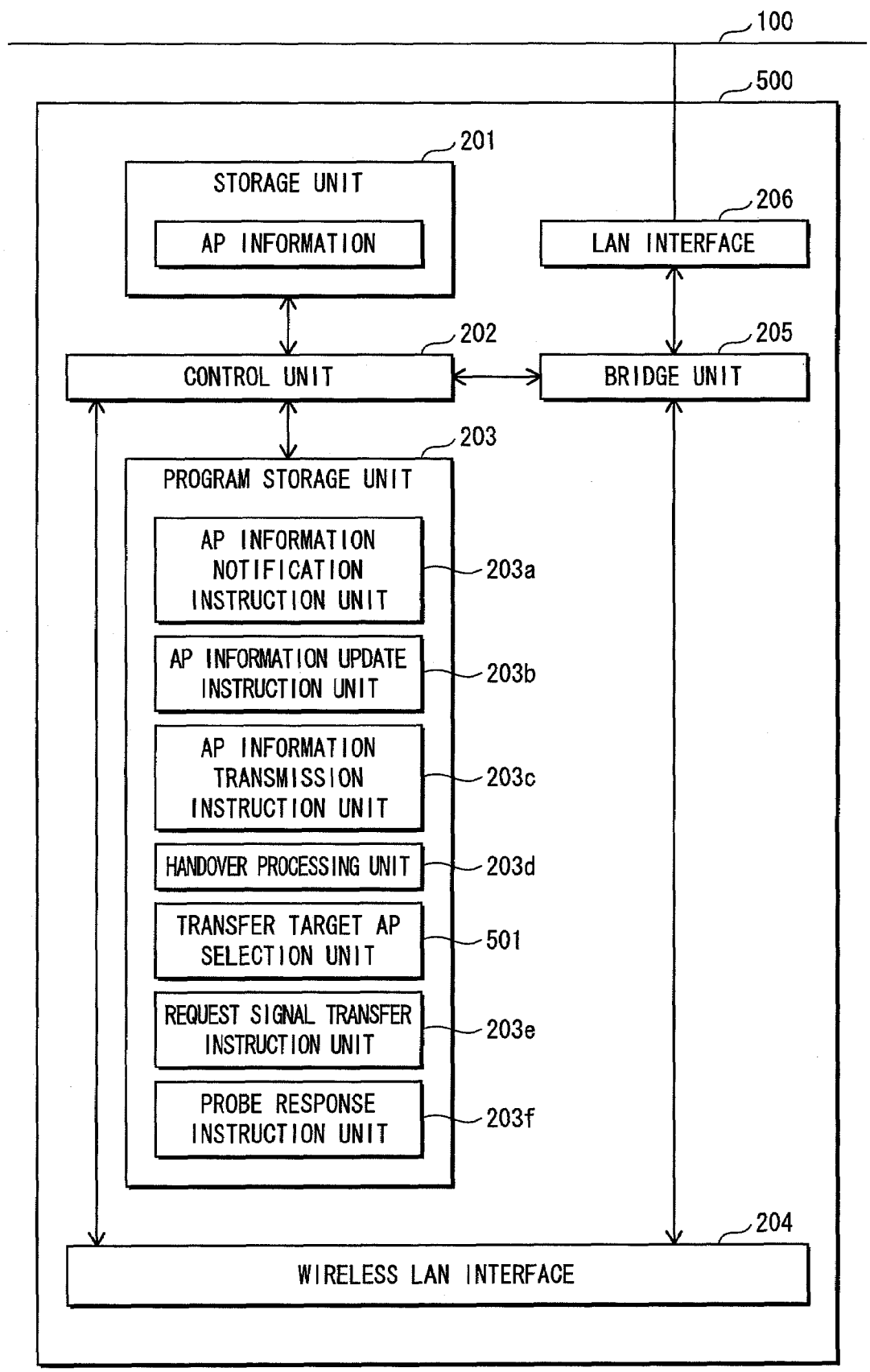
FIG. 12 is a block diagram showing a structure of an access point 500.

FIG. 12 is a block diagram showing the structure of the access point 500.

The access point 500 includes a new transfer target AP selection unit 501 as a program in the program storage unit 203.

Prior to the request signal transfer instruction unit 203e performing transfer instruction processing on the probe request frame, the transfer target AP selection unit 501 selects SSIDs of all other access points 500, other than its access point 500, included in the AP information in the storage unit 201, and notifies the SSIDs to the request signal transfer instruction unit 203e.

The transfer target AP selection unit 501 issues an instruction to transfer the probe request frame to the neighboring access points 500 indicated by the SSIDs selected by the transfer target AP selection unit 501.

1.2 Station Structure

Since the station pertaining to embodiment 3 has substantially the same structure as the station 300 of embodiment 1, the same reference notations are used, and the station in the present embodiment is also described as the station 300.

In embodiment 3, the probe request instruction unit 303d of the station 300 transmits the probe request frame to the serving access point 500 without including the SSIDs of the neighboring access points 200 indicated by the AP information in the storage unit 304.

2. Data

Figure 13:
FIG. 13 shows a data structure of a probe request frame transmitted by the station 300 in embodiment 3.

FIG. 13 shows a data structure of the probe request frame transmitted by the station 300 in embodiment 3.

As shown in FIG. 13, in embodiment 3, the probe request frame transmitted by the station 300 includes frequency information indicating the frequency specified by the frequency specification unit 303c, in addition to the information in a probe request frame specified in the IEEE 802.11 standard (own SSID and support rate).

3. Operation

Since the operation of the serving access point 500 is unique in embodiment 3 compared to embodiment 1, the following description focuses on the operation of the access point 500.

Note that similarly to the access points 200 in embodiment 1, the access points 500 are divided into a serving access point 500a and neighboring access points 500b to 500f.

The serving access point 500a performs the operation of the serving access point 200a indicated in embodiment 1 (steps S200 to S202), except that an operation of step S203 is performed in place of step S201.

The operation of steps S200 and S202 is not described here.

Figure 14:
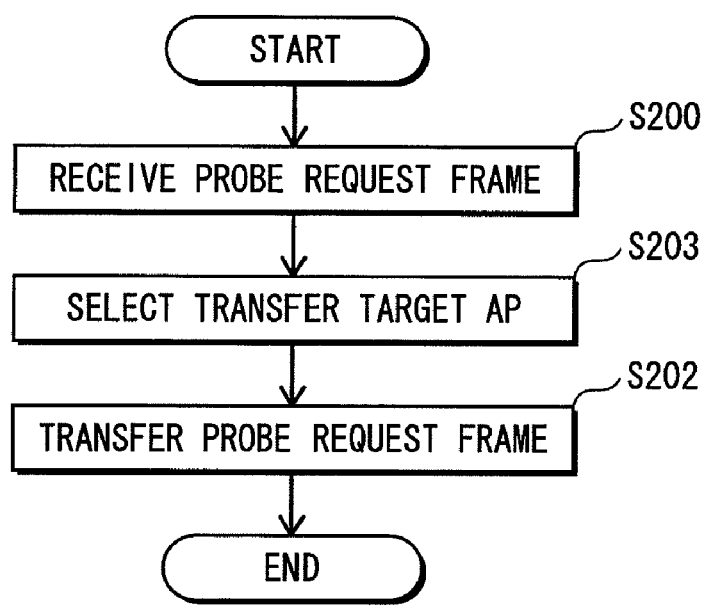

FIG. 14 is a flowchart showing the operation of the serving access point 500a.

Upon receiving a probe request frame from the station 300 (step S200), the serving access point 500a selects, with reference to the AP information in the storage unit 201, the neighboring access points 500b to 500f indicated by the SSIDs as transfer targets (step S203).

The serving access point 500a transfers the probe request frame to the neighboring access points 500b to 500f selected in step S203 (step S202).

Note that in embodiment 3, the operation of the neighboring access points 500b to 500f are similar to the operation of the neighboring access points 200b to 200f indicated in embodiment 1 (steps S300 to S305).

Also, the operation of the station 300 in embodiment 3 is substantially similar to the operation in embodiment 1 (steps S100 to S110). The difference is that in step S105, the station 300 transmits the probe request frame without including the SSIDs of the neighboring access points 500.

As described above, in embodiment 3, since the access points 500 select SSIDs of transfer targets for the probe request frame, the station 300 need not specify the SSIDs of all of the neighboring access points 500b to 500f.

This enables reducing the amount of time taken by the station 300 to refer to the AP information and reducing the processing load. Also, this enables reducing the amount of AP information exchanged between the access point 500 and the station 300, since the access points 500 need not include the SSIDs of the access points 500 as items of AP information to be transmitted periodically to the station 300.

Embodiment 4

The following describes the wireless communication system of embodiment 4.

In embodiment 3, the serving access point transfers probe request frames to all of the neighboring access points included in the AP information.

In contrast, embodiment 4 is different in that the serving access point specifies access points that satisfy a predetermined condition from among the neighboring access points, and transmits the probe request only to the specified access points.

The following description focuses on differences from embodiment 3.

1. Structure 1.1 Station Structure

Since the station pertaining to embodiment 4 has a structure that has been changed from the structure of the station 300 of embodiment 3, a different reference notation is used, and the station is referred to as a station 600.

Note that in the structure of the station 600, components having the same structure as in the station 300 have been given the same reference notations, and description thereof is omitted here.

Figure 15:
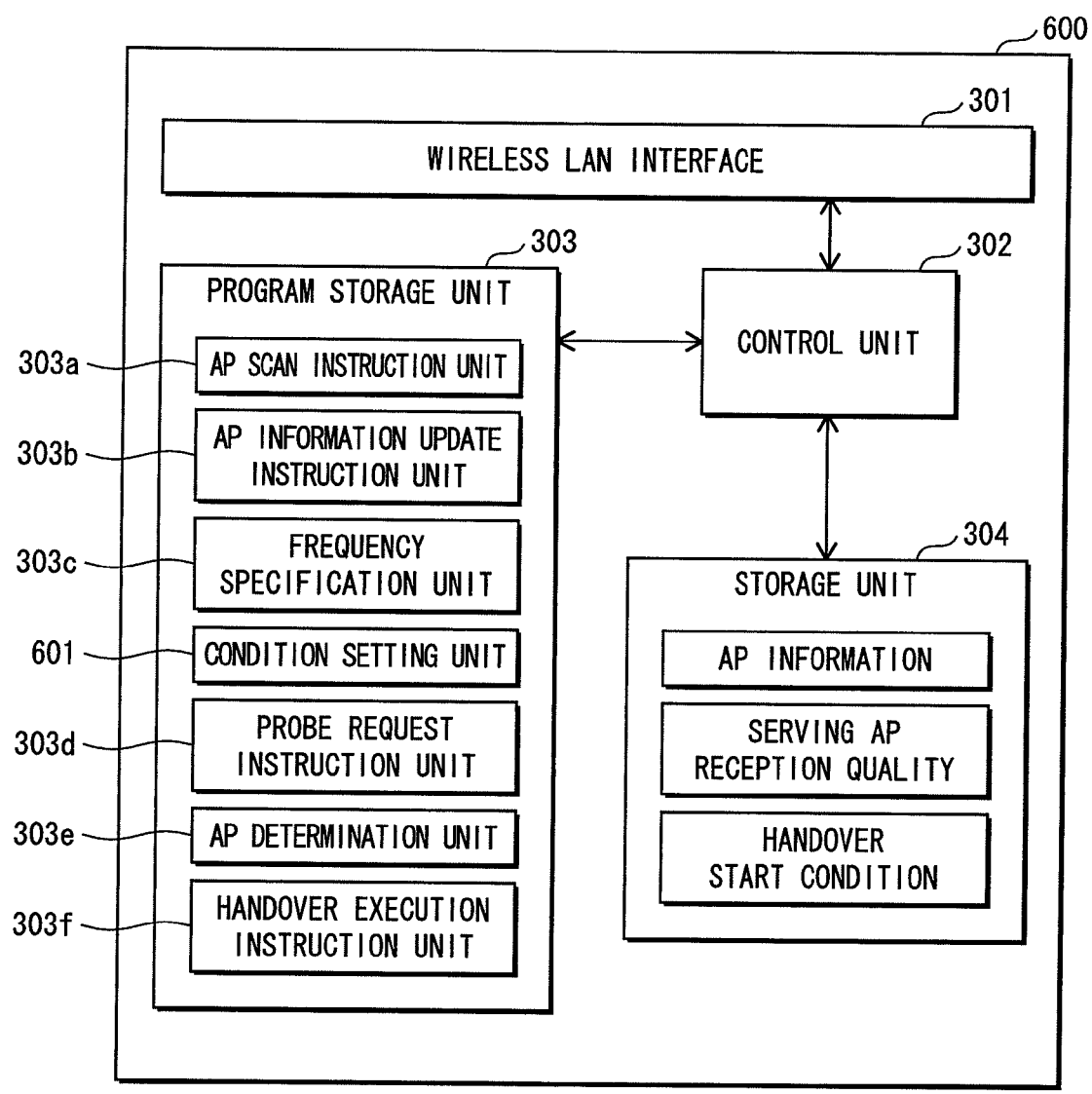
FIG. 15 is block diagram showing a structure of a station 600.

FIG. 15 is block diagram showing the structure of the station 600.

The station 600 includes a new condition setting unit 601 as a program in the program storage unit 303.

Prior to the probe request instruction unit 303d issuing an instruction to transmit the probe request frame, the condition setting unit 601 sets a condition that transfer target neighboring access points must satisfy.

For example, the condition is an upper threshold for the channel busy rate of the neighboring access points.

In embodiment 4, the probe request instruction unit 303d issues an instruction to transmit a probe request frame that includes condition information indicating the condition set by the condition setting unit 601.

1.2 Access Point Structure

Since the access points pertaining to embodiment 4 have substantially the same structure as the access points 500 of embodiment 3, the same reference notations are used, and the access points in the present embodiment are also described as the access points 500.

In embodiment 4, the AP information notification instruction unit 203a of each access point 500 periodically issues an instruction to transmit its channel busy rate to the other access points 500, in addition to information pertaining to its SSID and used frequency, as AP information.

Also, in embodiment 4, the transfer target AP selection unit 501 of each access point 500 selects one or more access points from among the neighboring access points 500 whose channel busy rate is greater than or equal to a predetermined threshold, with reference to the AP information in the storage unit 201, according to the condition information (upper threshold for the channel busy rate) included in the probe request frame transferred from the neighboring access points 500.

2. Operation

Since the operation of the station 600 is unique in embodiment 4 compared to embodiment 3, the following description focuses on the operation of the station 600.

The station 600 performs a new operation of step S112, in addition to the operation of the station 300 indicated in embodiment 3 (steps S100 to S110).

The operation of steps S100 to S110 is not described here.

Figure 16:
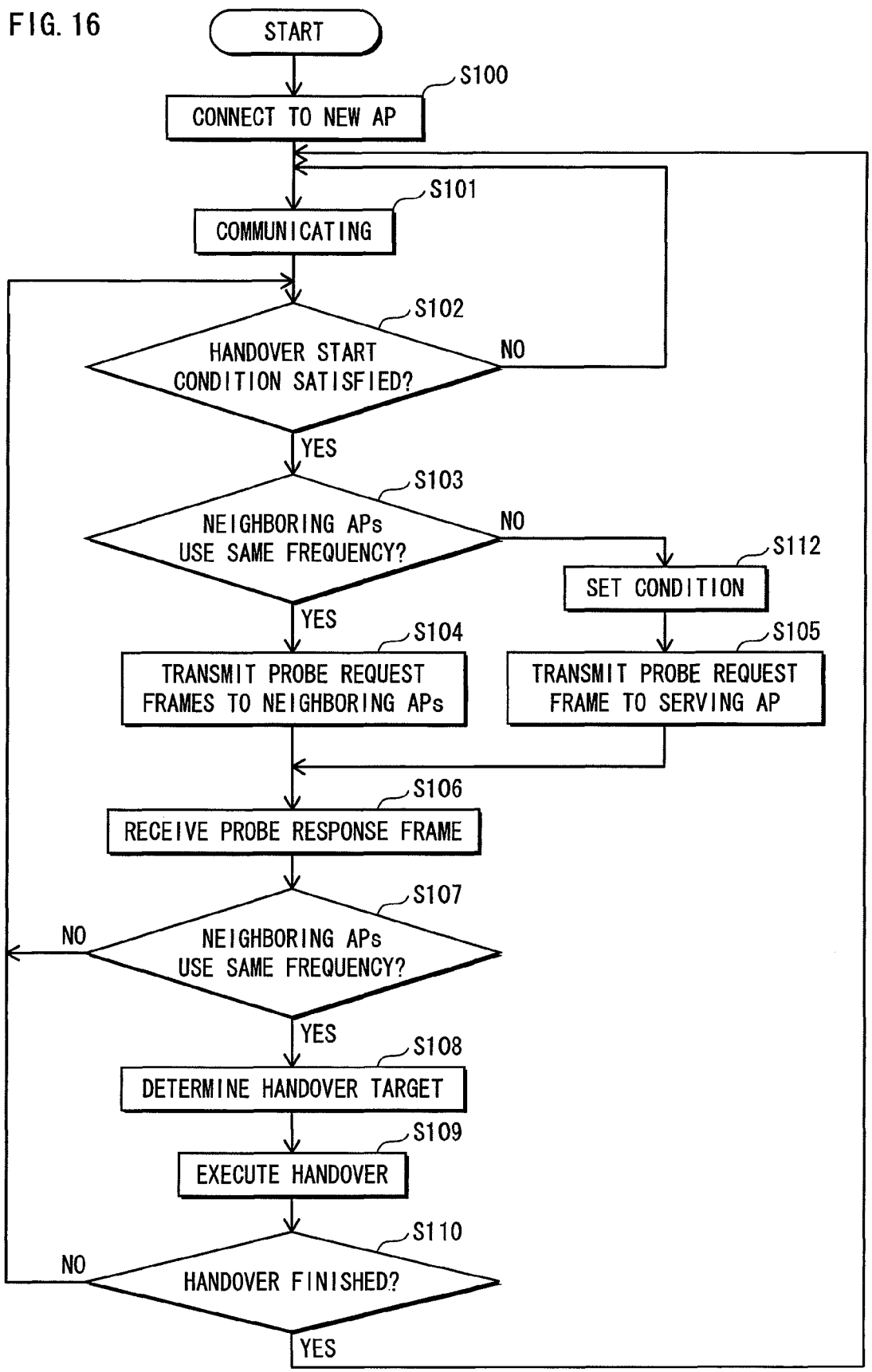
FIG. 16 is a flowchart showing operation of the station 600 pertaining to embodiment 4.

FIG. 16 is a flowchart showing operation of the station 600 according to embodiment 4.

After the handover start condition has been satisfied (step S102:YES), if the neighboring access points 500b to 500f do not use the same frequency as the serving access point 500a (step S103:NO), the station 600 sets the upper threshold for the channel busy rate as the predetermined condition (step S112).

In step S105, the station 600 transmits, to the serving access point 500a, a probe request frame including the condition information indicating the upper threshold set in step S112 and the frequency information indicating the frequency CHg not used by the access points 500.

Note that in embodiment 4, the operation of the serving access point 500a is substantially similar to the operation in embodiment 3 (steps S200, S203, and S202).

The difference is that in step S203, the serving access point 500a only selects one or more neighboring access points 500 whose channel busy rate is less than or equal to the upper threshold for the channel busy rate, as indicated by the condition information included in the probe request frame received from the station 600.

Also, in embodiment 4, the operation of the neighboring access points 500b to 500f is similar to the operation in embodiment 3 (steps S300 to S305).

As described above, in embodiment 4, the access points 500 notify their respective channel busy rates to each other, and the station 600 sets a condition pertaining to the channel busy rate and transmits the probe request frame. The serving access point 500a transfers the probe request frame only to the one or more neighboring access points 500 that satisfy the condition set by the station 600.

This enables the station 600 to only select as handover target candidates and only receive probe response frames from the neighboring access points 500 that can ensure the availability of bandwidth considered necessary by the station 600.

Embodiment 5

The following describes the wireless transmission system of embodiment 5.

In embodiment 4, the serving access point selects, according to a condition set by the station, one or more neighboring access points to which to transmit a probe request frame.

In contrast, embodiment 5 is different in that the neighboring access points spontaneously make a judgment, according to a condition set by the station, as to whether a probe response frame can be transmitted.

The following description focuses on differences from embodiment 4.

1. Structure 1.1 Station Structure

Since the station pertaining to embodiment 5 has substantially the same structure as the station 600 of embodiment 4, the same reference notation is used, and the station in the present embodiment is also described as the station 600.

1.2 Access Point Structure

Since the access points in embodiment 5 are an improvement on the structure of the access points 500 of embodiment 4, different reference notations are used, and the access points are referred to as access points 700.

Note that in the structure of the access points 700, components having the same structure as in the access points 500 have been given the same reference notations, and description thereof is omitted here.

Figure 17:
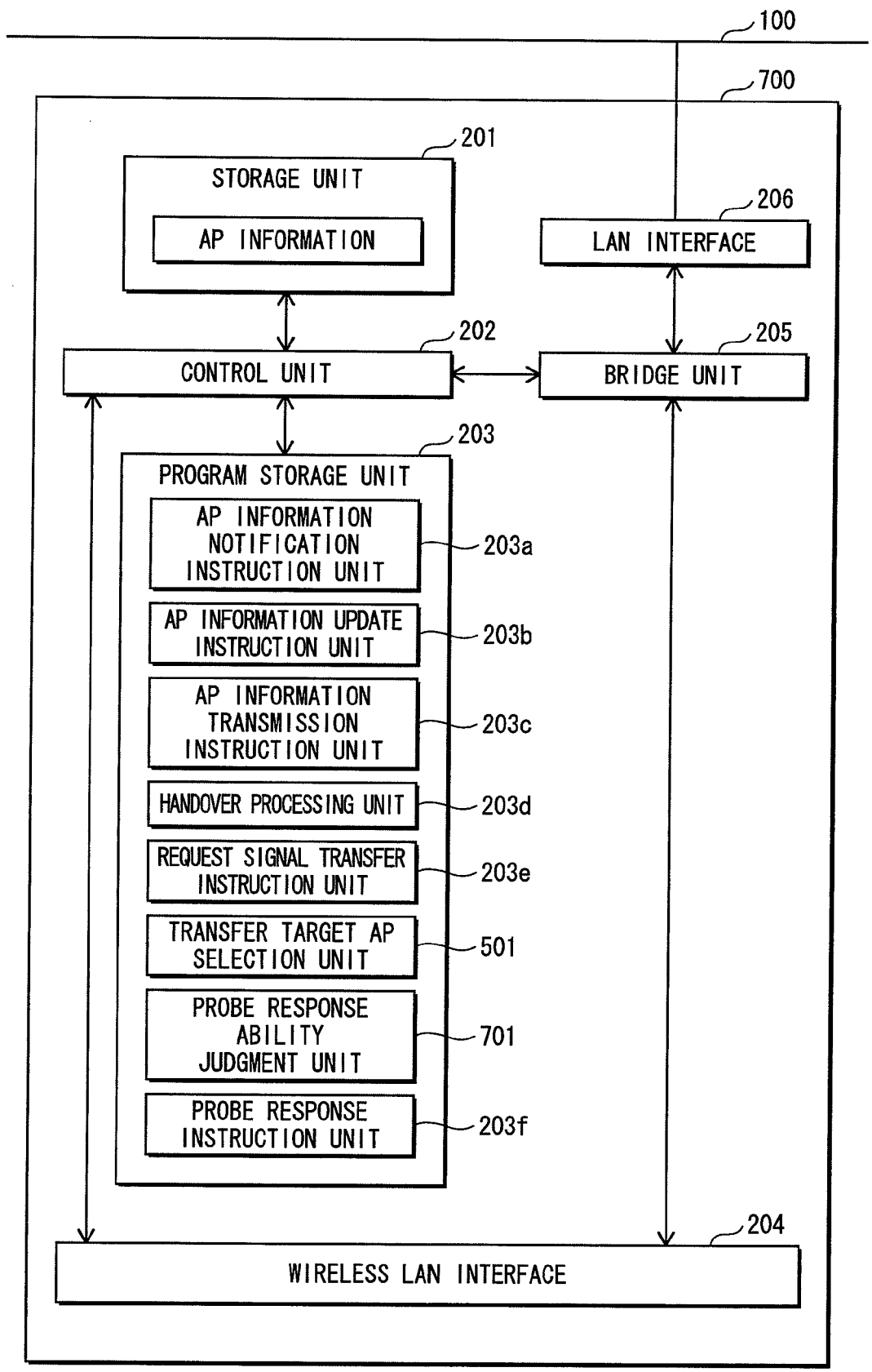
FIG. 17 is a block diagram showing a structure of an access point 700.

FIG. 17 is a block diagram showing the structure of the access point 700.

In embodiment 5, the request signal transfer instruction unit 203*e* transfers the probe request frame to all of the neighboring access points with reference to the SSIDs of the neighboring access points 700 included in the AP information in the storage unit 201.

The access point 700 includes a new probe response ability judgment unit 701 as a program in the program storage unit 203.

Prior to the probe response instruction unit 203*f* issuing a response instruction, the probe response ability judgment unit 701 refers to the condition information included in the probe request frame, and judges whether its own access point is to transmit a probe response frame. If the channel busy rate of the access point is less than or equal to the upper threshold indicated by the condition information, the probe response instruction unit 203*f* issues an instruction that its own access point is to transmit a probe response frame. If the channel busy rate of the access point is above the upper threshold indicated by the condition information, the probe response instruction unit 203*f* issues an instruction indicating that its own access point is not to transmit a probe response frame.

The probe response instruction unit 203*f* performs transmission of the probe response frame only upon receiving a notification from the probe response ability judgment unit 701 to the effect that the access point is able to transmit the probe response frame.

2. Operation

Since the operation of the access points 700 is unique in embodiment 5 compared to embodiment 4, the following description focuses on the operation of the access points 700.

The operation of the serving access point 700*a* is similar to the operation of the access point 500*a* of embodiment 3 (steps S200, S203, and S202).

The neighboring access points 700*b* to 700*f* perform a new operation of step S306 in addition to the operation of the neighboring access points 200*b* to 200*f* of embodiment 1 (steps S300 to S305).

The operation of steps S300 to S305 is not described here.

Figure 18:
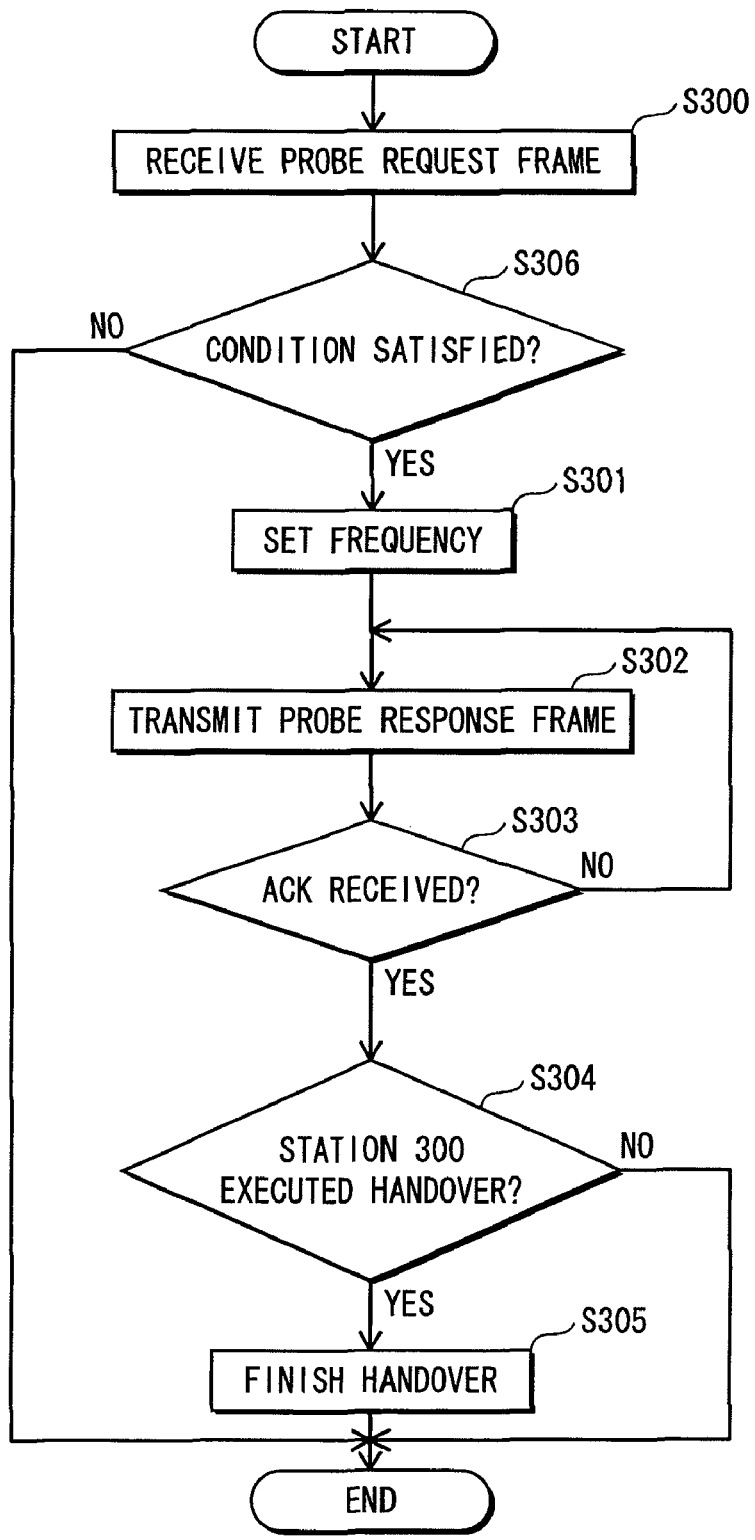
FIG. 18 is a flowchart showing operation of neighboring access points 700b to 700f.

FIG. 18 is a flowchart showing the operation of the neighboring access points 700*b* to 700*f*.

Upon receiving a probe request frame from the serving access point 700*a* (step S300), each of the neighboring access points 700*b* to 700*f* references the condition information included in the probe request frame, and judges whether the condition is satisfied, that is, whether its respective channel busy rate is less than or equal to the upper threshold indicated by the condition information (step S306).

If the channel busy rate satisfies the condition (step S306: YES), the probe response frame is transmitted according to the procedures in steps S301 to S302.

If the channel busy rate does not satisfy the condition (step S306:NO), the probe response frame is not transmitted.

Note that in embodiment 5, the operation of the station 600 is similar to the operation in embodiment 4 (steps S100 to S112).

As described above, in embodiment 5, a judgment is made as to whether the neighboring access points satisfy a condition set by the station (the upper threshold for the channel busy rate), and the probe response frame is only transmitted if the condition is satisfied.

This being the case, the serving access point need not perform any particular selection operation, and can merely transmit the probe request frame to all of the neighboring access points.

Embodiment 6

The following describes a wireless communication system of embodiment 6.

In embodiment 1, the neighboring access points transmit the probe response frame soon after receiving the probe request frame.

In contrast, embodiment 6 is different in that the neighboring access points adjust timings of transmitting the probe response frames in accordance with a priority set by the station.

The following description focuses on differences from embodiment 1.

1. Structure 1-1 Access Point Structure

Since the access points pertaining to embodiment 6 have substantially the same structure as the access points 200 of embodiment 1, the same reference notations are used, and the access points in the present embodiment are also described as the access points 200.

In embodiment 6, the AP information notification instruction unit 203*a* of each access point 200 periodically issues an instruction to transmit its channel busy rate to the other access points 200, in addition to information pertaining to its SSID and used frequency, as AP information.

In embodiment 6, when the probe response instruction unit 203*f* transmits the probe response frames, the access points 200 adjust the transmission timings of the probe response frames according to priority information included in the received probe request frames.

Specifically, for example, the probe response instruction unit 203*f* issues an instruction to transmit probe response frames in descending order starting from an assigned highest priority (first rank) access point, waiting a predetermined time period T1 between transmission timings. In other words, the probe response instruction unit 203*f* instructs an access point that has been assigned the first rank priority to transmit the probe response frame immediately, an access point that has been assigned a second rank priority to transmit the probe response frame after waiting T1, an access point that has been assigned a third priority to transmit the probe response frame after waiting 2T1 seconds, and so on.

1.2 Station Structure

Since the station pertaining to embodiment 6 has a structure that has been changed from the structure of the station 300 of embodiment 1, a different reference notation is used, and the station is referred to as a station 800.

Note that in the structure of the station 800, components having the same structure as in the station 300 have been given the same reference notations, and description thereof is omitted here.

Figure 19:
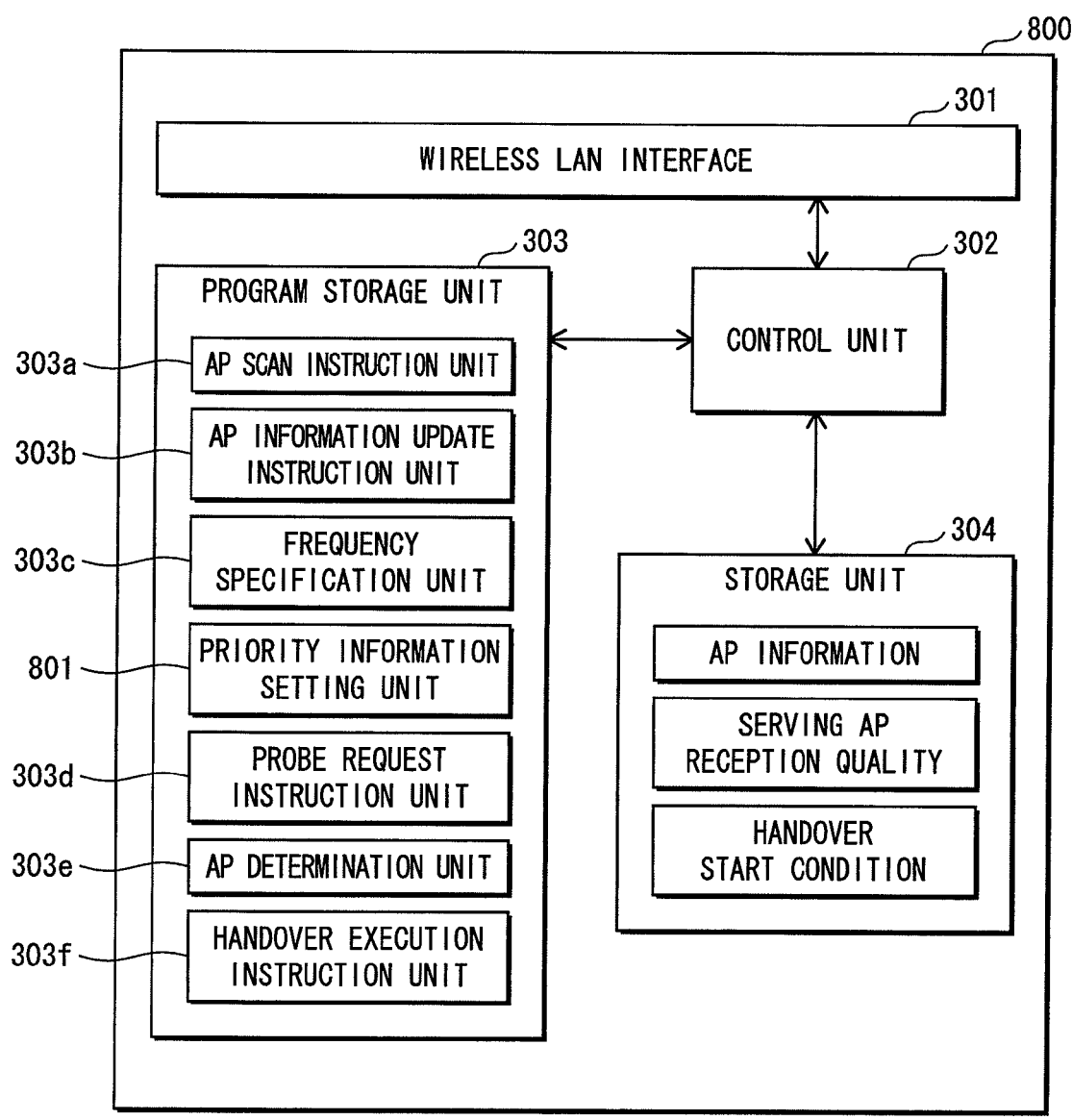
FIG. 19 is a block diagram showing a structure of a station 800.

FIG. 19 is a block diagram showing the structure of the station 800.

The station 800 includes a new priority information setting unit 801 as a program in the program storage unit 303.

Prior to the probe request instruction unit 303*d* issuing a probe request instruction, the priority information setting unit 801, with reference to the channel busy rate included in the AP information in the storage unit 304, assigns a priority to each of the access points 200*b* to 200*f* in order from the lowest channel busy rate to the highest channel busy rate, and notifies results of the priority assignment to the probe request instruction unit 303*d*.

In embodiment 6, the probe request instruction unit 303*d* issues an instruction to transmit a probe request frame that includes priority information indicating the priority notified by the priority information setting unit 801.

2. Data

Similarly to the AP information of embodiment 2 shown in FIG. 10, the AP information in embodiment 6 includes a channel busy rate for each of the access points 200.

3. Operation

Since the operation of the station 800 and the neighboring access points 200 are unique in embodiment 6 compared to embodiment 1, the following description focuses on the operation of the station 800.

3.1 Station Operation

The station 800 performs a new operation of step S113, in addition to the operation of the station 300 in embodiment 1 (steps S100 to S110).

The operation of steps S100 to S110 is not described here.

Figure 20:
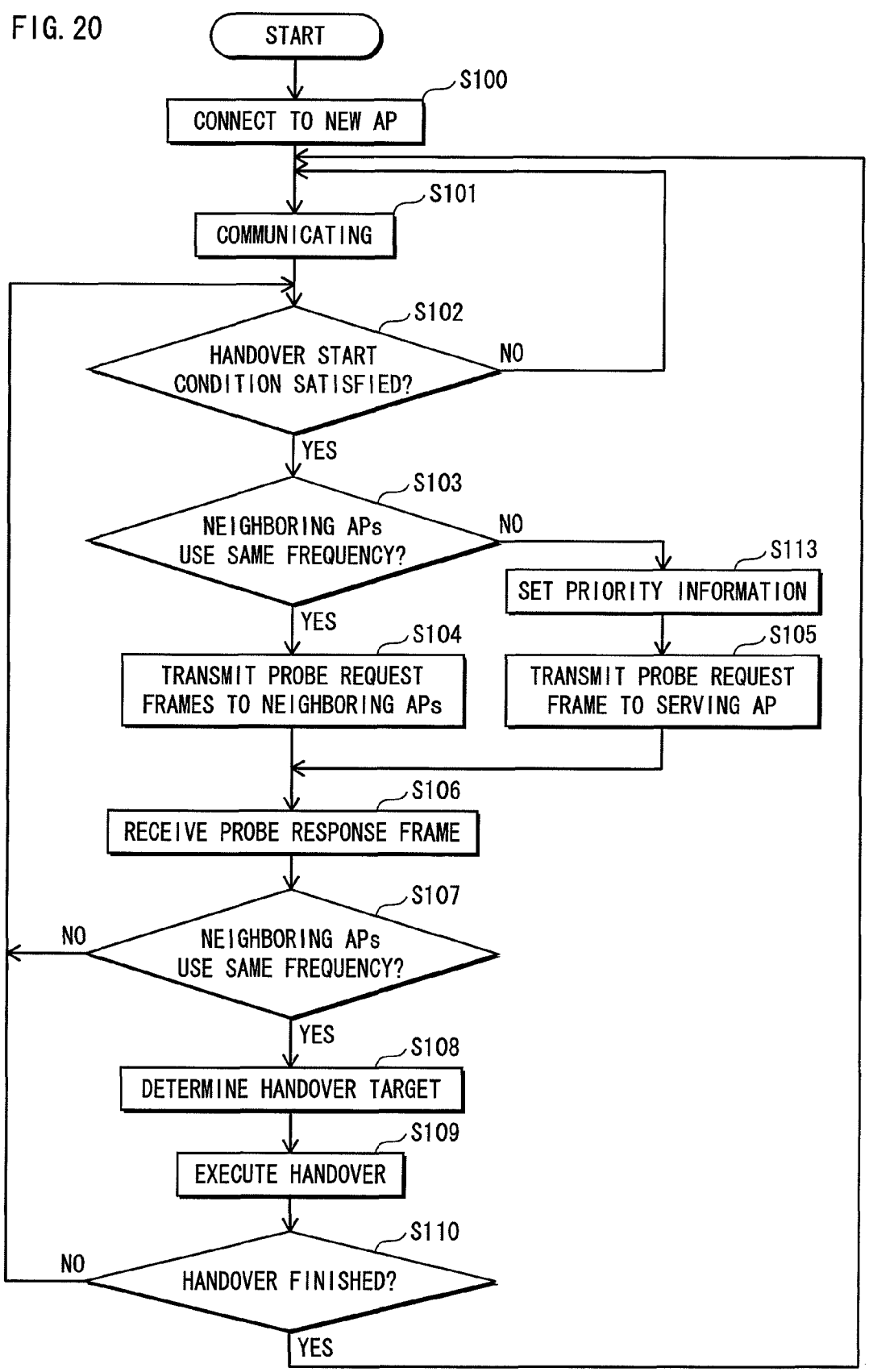
FIG. 20 is a flowchart showing operation of the station 800.

FIG. 20 is a flowchart showing the operation of the station 800.

After the handover start condition has been satisfied (step S102:YES), if the neighboring access points 200*b* to 200*f* do not use the same frequency as the serving access point 200*a* (step S103:NO), the station 800 performs priority assignment based on the channel busy rates of each of the neighboring access points 200*b* to 200*f* with reference to the AP information, and sets the priority information generated as a result of the priority assignment (step S113).

In step S105, the station 800 transmits, to the serving access point 200*a*, the probe request frame to which has been added the priority information set in step S113.

3.2 Neighboring Access Point Operation

The neighboring access points 200*b* to 200*f* perform a new operation of step S307 in addition to the operation in embodiment 1 (steps S300 to S305).

The operation of steps S300 to S305 is not described here.

Figure 21:
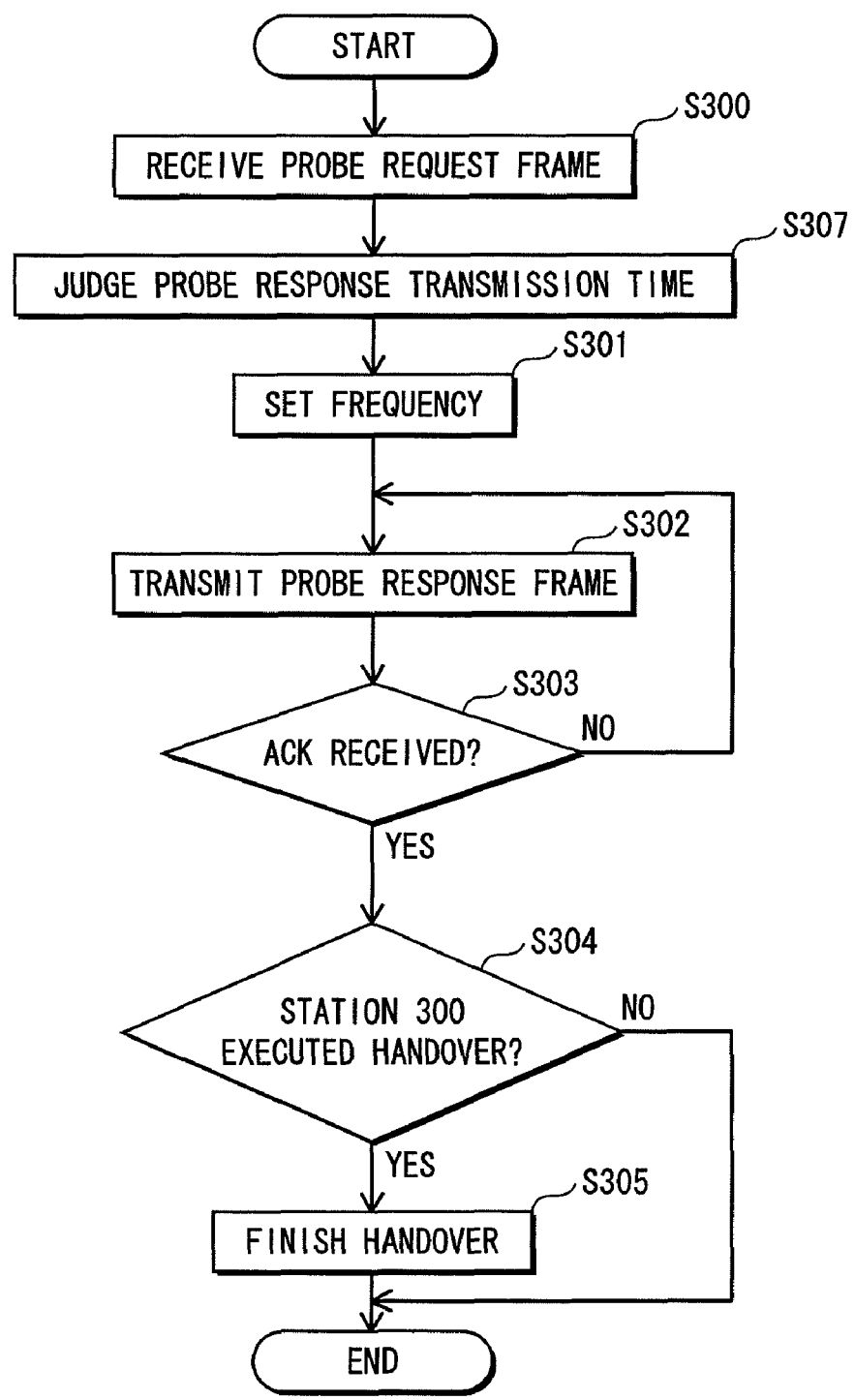
FIG. 21 is a flowchart showing operation of the neighboring access points 200b to 200f pertaining to embodiment 6.

FIG. 21 is a flowchart showing operation of the neighboring access points 200*b* to 200*f* pertaining to embodiment 6.

Upon receiving a probe request frame from the serving access point 200*a* (step S300), with reference to the priority information included in the probe request frame, the neighboring access points 200*b* to 200*f* judge a transmission time for the probe response frame according to each of the respective assigned priorities of the neighboring access points 200*b* to 200*f* (step S307).

In steps S301 to S302, the probe response frame is transmitted according to the transmission time judged in step S307.

Figure 22:
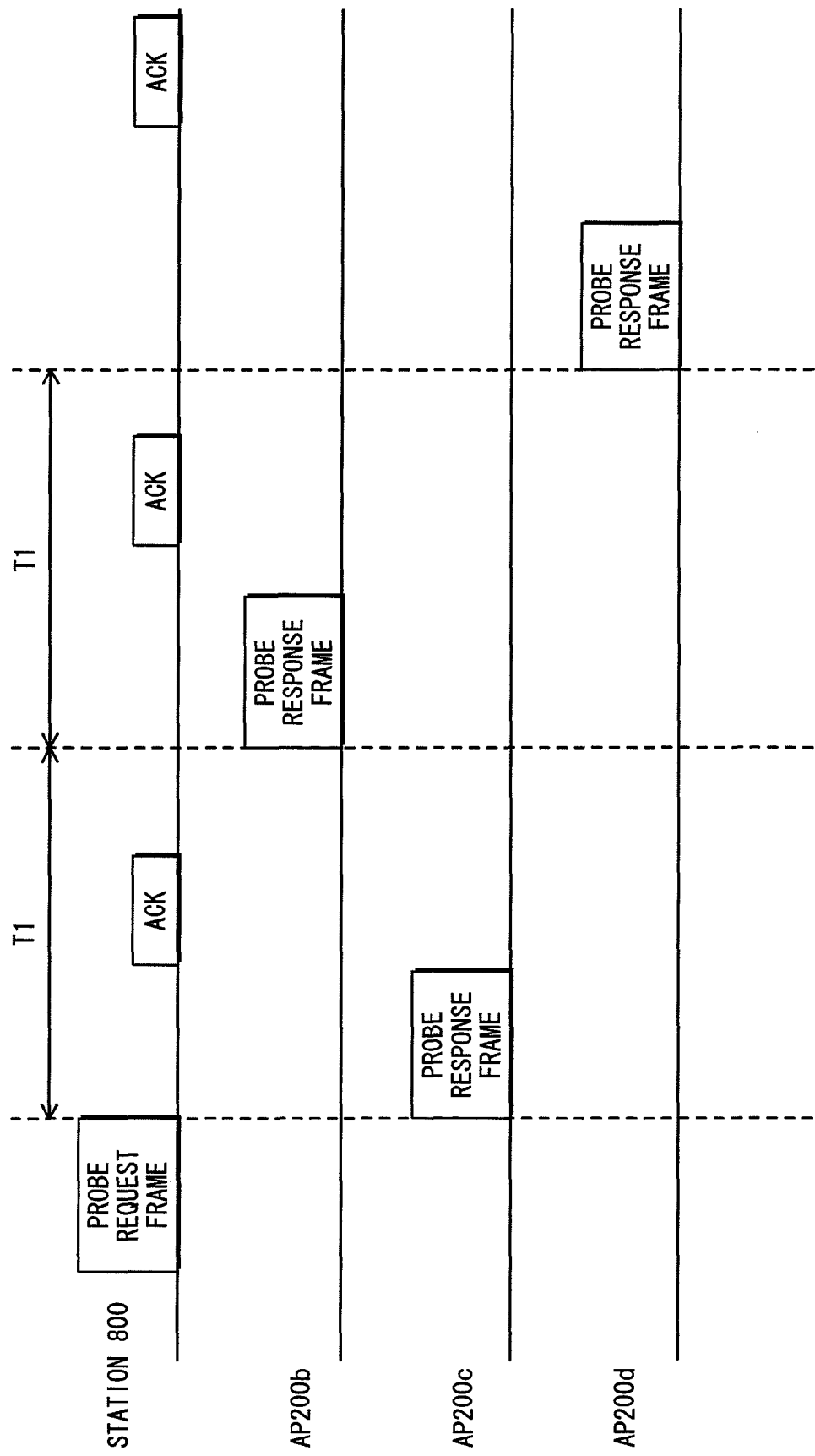
FIG. 22 shows transmission timings of probe response frames of the neighboring access points.

Here, as a specific example, FIG. 22 depicts the transmission timings of the probe response frames for each of the neighboring access points 200*b* to 200*f* in a case that a first rank priority is assigned to the neighboring access point 200*c*, a second rank priority is assigned to the neighboring access point 200*b*, and a third rank priority is assigned to the neighboring access point 200*d*.

As shown in FIG. 22, the neighboring access point 200*c* having the first priority rank transmits the probe response frame immediately after receiving the probe request frame from the station 800. The neighboring access point 200*b* having the second priority rank transmits the probe response frame when T1 has passed after receiving the probe request frame. The neighboring access point 200*c* having the third priority rank transmits the probe response frame when 2T1 has passed after receiving the probe request frame. Similar operation is performed for the neighboring access points 200*e* and 200*f* to which other priorities (third rank and fourth rank) have been assigned.

Note that in embodiment 6, the operation of the serving access point 200*a* is similar to the operation in embodiment 1 (steps S200 to S202).

As described above, in embodiment 6, the station 800 assigns priorities to the neighboring access points 200, and the neighboring access points 200 transmit the probe response frames in order from the highest priority to the lowest priority.

This enables the station 800 to judge handover suitability by receiving probe response frames from the neighboring access points 200 in order of preference.

4. Variations

In embodiment 6, the station 800 sets a priority in the priority information setting unit 801, and transmits the probe request frame including the priority information indicating the set priority. However, the station 800 may transmit a condition for performing the priority assignment, and the serving access point may perform the priority assignment.

The station in the present variation has the same structure as the station 600 in embodiment 4.

Specifically, prior to the probe request instruction unit 303*d* issuing the instruction to transmit the probe request frame, the condition setting unit 601 sets a condition that a transfer target neighboring access point must satisfy.

Also, the probe request instruction unit 303*d* transmits a probe request frame including condition information indicating the condition set by the condition setting unit 601.

Figure 23:
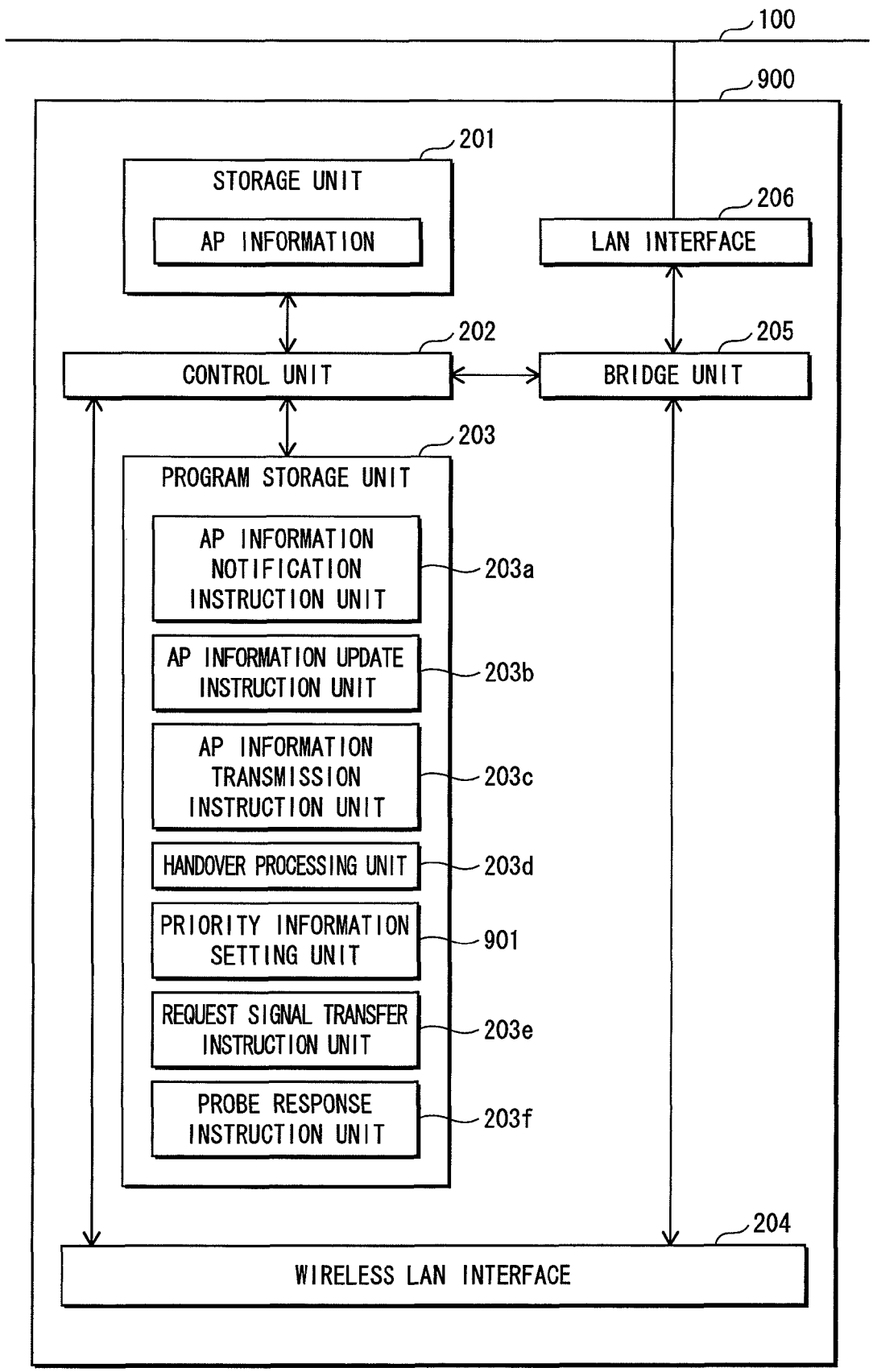
FIG. 23 is a block diagram showing a structure of an access point 900.

The access points in the present variation are referred to as access points 900. As shown in FIG. 23, the access points 900 include a new priority information setting unit 901 as a program in the program storage unit 203.

The priority information setting unit 901, with reference to the condition information included in the probe request frame, performs priority assignment on neighboring access points 900*b* to 900*f* in order from a most to a least degree of satisfying the condition.

The request signal transmission instruction unit 203*e* issues an instruction to transfer the probe request frame including the priority information indicating the priority set by the priority information setting unit 901.

In the above-described structure, merely by the station notifying the condition to the serving access point, the serving access point can notify the priority information to the neighboring access points.

This structure enables reducing the amount of time needed for the station to perform priority assignment processing, and reducing the processing load.

Supplementary Remarks

Although the wireless transmission system of the present invention is described above based on embodiments 1 to 6, various modifications can be added to the structures described in the embodiments.

(1) When the station determines a neighboring access point as a handover target and executes handover processing (steps S108 to S109), various configurations can be extracted from embodiments 1 to 6, as described below.

Here, regarding handover processing between a station 300 and the access points 200 in embodiment 1, an example is described of the neighboring access point 200b being selected as a handover target.

Figure 24:
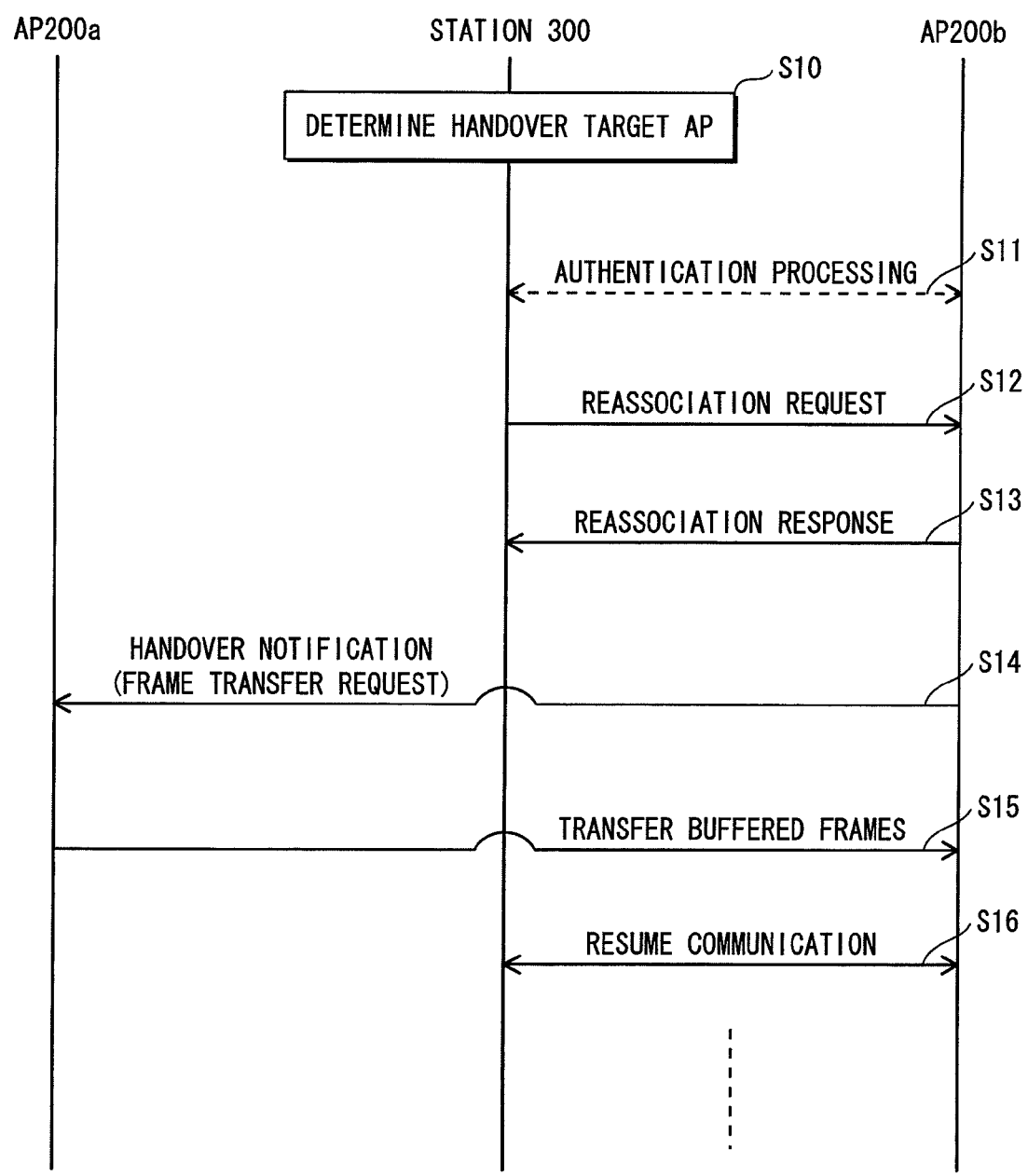
FIG. 24 shows a first configuration of handover processing between the station and the access points.

FIG. 24 shows a first configuration of handover processing between the station 300 and the access points 200.

After determining one of the neighboring access points (the neighboring access point 200b) as the handover target (step S10), when handing over to the access point 200b, the station 300 performs authentication and establishment of reassociation (step S11).

Here, although the station 300 must perform authentication before the establishment of reassociation, the authentication need not be performed immediately prior to the establishment of reassociation, provided that the authentication processing is completed before beginning to execute the handover.

When the authentication processing has finished, the station 300 transmits a reassociation request frame to the access point 200b (step S12). The reassociation request frame includes an SSID of the serving access point 200a. The access point 200b, having received the reassociation request frame, transmits a reassociation response frame to the station 300 (step S13).

Furthermore, upon recognizing the reassociation request from the station 300, the access point 200b transmits a notification to that effect to the serving access point 200a via the network line 100 (step S14). Then, the serving access point 200a transfers a buffered frame addressed to the station 300 to the access point 200b (step S15). Handover is performed in the manner described above, and communication starts between the station 300 and the access point 200b (step S16).

Figure 25:
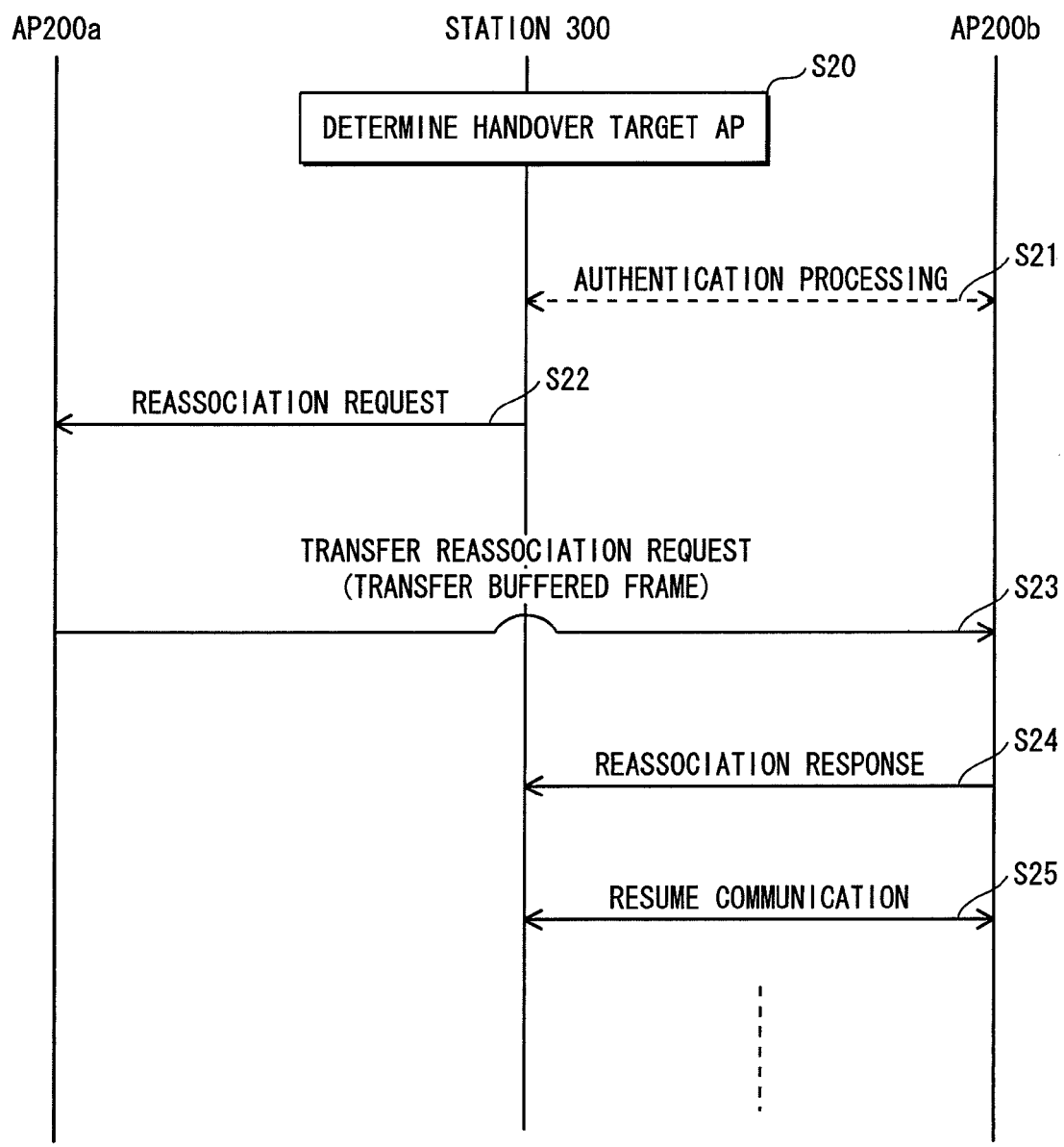
FIG. 25 shows a second configuration of handover processing between the station and the access points.

FIG. 25 shows a second configuration of handover processing between the station 300 and the access points 200. After determining a neighboring access point to target for handover (the neighboring access point 200b) (step S10), when authorization processing has finished, the station 300 transmits the reassociation request frame to the serving access point 200a (step S22). Here, the SSIDs of the serving access point 200a and the handover target access point 200b are included in the reassociation request frame.

The serving access point 200a that has received the reassociation request frame transfers the reassociation request frame to the access point 200b via the network line 100 (step S23). Here, the serving access point 200a judges that the handover target access point is the access point 200b, and starts transferring buffered frames addressed to the station 300 to the access point 200b.

If the station 300 cannot perform the reassociation, since a possibility of transmitting the buffered frames to the station 300 remains, the serving access point 200a holds the buffered data until an acknowledgement is made that the reassociation has been successful.

The access point 200b that has received the reassociation request frame transmits a reassociation response frame to the station 300 (step S24). Here, if the buffered data is transferred before the reassociation response frame is transmitted, the buffered data may be transmitted as data included in the reassociation response frame.

The second configuration enables suppressing interruptions of video and audio resulting from a delay in the transfer of the buffered data when the serving access point 200a transfers the buffered data to the access point 200b, since the serving access point 200a starts the transfer without waiting for a notification from the access point 200b.

(2) In embodiments 1 to 6, the example is given of the network line 100 being Ethernet (registered trademark). However, the present invention is not limited to this, and a different arbitrary communication path such as a power line for PLC (Power Line Communications), infrared radiation for infrared communications, may be used as the wireless communication path between the station 300 and the access point 200.

(3) In embodiments 1 to 6, the example is given that the AP information notification instruction unit 203a, the AP information update instruction unit 203b, the AP information transmission instruction unit 203c, the handover processing unit 203d, the request signal transfer instruction unit 203e, the probe response instruction unit 203f, the transfer target AP selection unit 501, the probe response ability judgment unit 701, and the priority information setting unit 901 are realized in the access points as programs that are stored in the program storage unit 203 and can be executed by the control unit 202. However, the present invention is not limited to this, and the individual units may be realized as hardware such as an LSI (Large Scale Integrated Circuit).

(4) In embodiments 1 to 6, the example is given that the AP scan instruction unit 303a, the AP information update instruction unit 303b, the frequency specification unit 303c, the probe request instruction unit 303d, the AP determination unit 303e, the handover execution instruction unit 303f, the AP selection unit 401, the condition setting unit 601, and the priority information setting unit 801 are realized in the station as programs that are stored in the program storage unit 303 and can be executed by the control unit 302. However, the present invention is not limited to this, and the individual units may be realized as hardware such as an LSI.

(5) In embodiments 1 to 6, an example is given of the handover start condition stored in the storage unit 304 of the station being a lower threshold for reception quality of the serving access point. However, the present invention is not limited to this, and various references can be employed, for example an upper threshold for a frame error rate between the serving access point and the station.

(6) Although an example of using a MAC address as the SSID is described in embodiments 1 to 6, the present invention is not limited to this, and the SSID need only be identification information that can be used to uniquely specify a station or an access point in the wireless LAN communication system.

(7) Although an example is described in embodiments 1 to 6 of searching neighboring access points when performing handover during communication after establishing wireless communication between the station and the serving access point, the present invention is not limited to this.

For example, the present invention is applicable in various circumstances such as causing the station to transfer the probe request frame to the serving access point after power to the station has been switched on and wireless communication has been started with the serving access point.

(8) The frame data structure (FIG. 4) in embodiment 1 is an example that conceptually shows the minimum necessary information for realizing the invention, and the present invention is not limited to this data structure.

(9) Although an example is described in embodiments 1 to 6 of the station judging whether handover processing is necessary based on the handover start condition in the storage unit 304, the present invention is not limited to this.

Specifically, for example, the serving access point may judge whether handover processing of the station is necessary.

In this case, the serving access point may include a supervision unit that supervises the quality of the communication with the station, and if the result of the supervision by the supervision unit indicates that the communication quality is below a predetermined threshold, the supervision unit may notify the station to perform handover processing.

(10) Although an example is described in embodiments 1 and 3 of the access points transmitting AP information to each other with use of the AP information notification instruction unit 203a, the present invention is not limited to this.

Specifically, for example, an operator of an access point may cause the AP information of other access points that are connected via the network line to be stored in advance in the storage unit 201 when the access point is installed. In such a case, the access points in embodiments 1 and 3 do not need to periodically exchange AP information with each other.

(11) Although an example is described in embodiments 3 and 4 of the serving access point judging or selecting a transfer target (a neighboring access point) for the probe request frame with reference to the AP information in its storage unit 201, in addition to this, the neighboring access point may determine a predetermined frequency for the neighboring access point to use when returning the probe response frame.

In such a case, the station need not use the frequency specification unit 303c to specify the predetermined frequency, and may merely transmit the probe request frame to the serving access point. The serving access point specifies, with reference to the AP information in the storage unit 201, a predetermined frequency not being used by the neighboring access points and transmits the specified frequency included in the probe request frame.

(12) In embodiments 1 to 7, different used frequencies are used by each access point as channels for distinguishing the access points from each other. However, the present embodiment is not limited to this, and for example, a spread code or a modulation method, etc. may be used as the channels.

(13) In embodiments 2, 4, 5, and 6, a channel busy rate is given as an example indicating a status of communication. However, the present invention is not limited to this, and other information may be used to indicate the communication state and communication quality, for example, a number of stations connected under the same access point, or a communication error rate.

Accordingly, various types of information can be added to the AP information to indicate the communication state and the communication quality.

The present invention is technology that can be broadly applied to a wireless LAN communication system, and is useful in enabling a wireless terminal to perform high-speed scanning on a plurality of base stations.

The invention claimed is:

1. A wireless communication system that includes a wireless terminal and a plurality of base stations, in which the plurality of base stations can communicate with each other via a predetermined communication path that is different from a wireless communication channel used to communicate with the wireless terminal, wherein
the wireless terminal includes
a request signal transmission unit operable to transmit, to one base station among the plurality of base stations, a request signal for requesting a response signal from one or more other base stations among the plurality of base stations, and
a response signal reception unit operable to receive the response signal transmitted from the one or more other base stations on a predetermined channel,
the one base station includes
a request signal reception unit operable to receive the request signal from the wireless terminal, and
a request signal transfer unit operable to transfer the request signal received by the request signal reception unit to the one or more other base stations via the predetermined communication path, and
the one or more other base stations include
a response signal transmission unit operable to transmit the response signal to the wireless terminal on the predetermined channel upon receiving the request signal transmitted from the one base station, wherein
the one base station is connected, via the predetermined communication path, to the plurality of base stations that include the one or more other base stations,
the wireless terminal further includes
a storage unit operable to store therein identification information for identifying each of the plurality of base stations, and
a selection unit operable to select the one or more other base stations from among the plurality of base stations with reference to the identification information, wherein
the request signal transmission unit transmits identification information pertaining to the one or more other base stations selected by the selection unit by including the information in the request signal, and
the request signal transfer unit transfers the request signal to the one or more other base stations identified by the identification information included in the request signal.

2. The wireless communication system of claim 1, wherein the one base station is a base station with which the wireless terminal has established a wireless connection, and the one or more other base stations are base stations with which the wireless terminal has not established a wireless connection.

3. The wireless communication system of claim 1, wherein in a case that the one or more other base stations are a plurality of other base stations, the predetermined channel is a same channel for each of the plurality of other base stations.

4. The wireless communication system of claim 1, wherein the storage unit further stores therein channel information indicating a channel used by the one or more other base stations for wireless communication, and
the wireless terminal further includes
a channel setting unit operable to reference the channel information and set, as the predetermined channel, one channel that is different from the channel used by the one or more other base stations, wherein
the request signal transmission unit transmits information indicating the predetermined channel set by the channel setting unit by including the information in the request signal.

5. The wireless communication system of claim 1, wherein the storage unit further stores therein channel information indicating a channel used by the one or more other base stations, and
the wireless terminal further includes
a channel setting unit operable to reference the channel information and set, as the predetermined channel, one channel that is different from the channel used by the one or more other base stations, wherein the request signal transfer unit transfers information indicating the predetermined channel set by the channel setting unit by including the information in the request signal.

6. A wireless communication system that includes a wireless terminal and a plurality of base stations, in which the plurality of base stations can communicate with each other via a predetermined communication path that is different from a wireless communication channel to the wireless terminal, wherein the wireless terminal includes
- a request signal transmission unit operable to transmit, to one base station among the plurality of base stations, a request signal for requesting a response signal from one or more other base stations among the plurality of base stations, and
- a response signal reception unit operable to receive the response signal transmitted from the one or more other base stations on a predetermined channel, the one base station includes
- a request signal reception unit operable to receive the request signal from the wireless terminal, and
- a request signal transfer unit operable to transfer the request signal received by the request signal reception unit to the one or more other base stations via the predetermined communication path, and the one or more other base stations include
- a response signal transmission unit operable to transmit the response signal to the wireless terminal on the predetermined channel upon receiving the request signal transmitted from the one base station, wherein the one base station is connected, via the predetermined communication path, to a plurality of base stations that include the one or more other base stations, the one base station further includes
- a storage unit operable to store identification information for identifying each of the plurality of base stations, and
- a selection unit operable to select the one or more other base stations from among the plurality of base stations with reference to the identification information, wherein the request signal transfer unit transfers the request signal to the one or more other base stations selected by the selection unit.

7. The wireless communication system of claim 1, wherein the one base station further includes
- a communication state information reception unit operable to periodically receive communication state information indicating respective communication states from each of the plurality of base stations via the predetermined communication path, and
- a communication state transmission unit operable to sequentially transmit, to the wireless terminal, the communication state information received by the communication state information reception unit, wherein the selection unit selects, as the one or more other base stations, a base station whose communication state information indicates a communication state that satisfies a predetermined condition, from among the plurality of base stations.

8. The wireless communication system of claim 6, wherein the one base station further includes
- a communication state information reception unit operable to periodically receive communication state information indicating respective communication states from each of the plurality of base stations via the predetermined communication path, wherein the selection unit selects, as the one or more other base stations, a base station whose communication state information has indicated a communication state that satisfies a predetermined condition, from among the plurality of base stations.

9. The wireless communication system of claim 1, wherein
the request signal transmission unit transmits the request signal along with a condition pertaining to a communication state of the one or more other base stations,
the request signal transfer unit transfers the request signal, along with the condition, to the one or more other base stations, and
the response signal transmission unit transmits the response signal only if the communication state of the one or more other base stations satisfy the predetermined condition.

10. A wireless communication system that includes a wireless terminal and a plurality of base stations, in which the plurality of base stations can communicate with each other via a predetermined communication path that is different from a wireless communication channel to the wireless terminal, wherein the wireless terminal includes
- a request signal transmission unit operable to transmit, to one base station among the plurality of base stations, a request signal for requesting a response signal from one or more other base stations among the plurality of base stations, and
- a response signal reception unit operable to receive the response signal transmitted from the one or more other base stations on a predetermined channel, the one base station includes
- a request signal reception unit operable to receive the request signal from the wireless terminal, and
- a request signal transfer unit operable to transfer the request signal received by the request signal reception unit to the one or more other base stations via the predetermined communication path, and the one or more other base stations include
- a response signal transmission unit operable to transmit the response signal to the wireless terminal on the predetermined channel upon receiving the request signal transmitted from the one base station, wherein the wireless terminal further includes
- a judgment unit operable to judge whether performing handover processing is necessary,
- a base station determination unit operable to, in a case that the one or more other base stations are a plurality of other base stations, determine one other base station from among the plurality of other base stations in accordance with the response signals received by the response signal reception unit, and
- a handover petition unit operable to petition that handover be performed to the other base station determined by the base station determination unit, wherein the request signal transmission unit transmits the request signal if the judgment unit has judged that the handover processing is necessary, and each of the plurality of other base stations further include a handover processing unit operable to perform handover processing for establishing a wireless connection with the wireless terminal upon receiving a handover petition from the wireless terminal.

* * * * *